(12) United States Patent
Brost

(10) Patent No.: US 7,006,764 B2
(45) Date of Patent: Feb. 28, 2006

(54) USER INTERFACE FOR CONTROLLING CROPPING IN ELECTRONIC CAMERA

(75) Inventor: Randolph C. Brost, Albuquerque, NM (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/292,235

(22) Filed: Nov. 12, 2002

(65) Prior Publication Data

US 2004/0091256 A1 May 13, 2004

(51) Int. Cl.
*G03B 13/10* (2006.01)
*G03B 17/00* (2006.01)
*H04N 5/222* (2006.01)
*H04N 5/225* (2006.01)
*H04N 2/262* (2006.01)

(52) U.S. Cl. .......................... 396/380; 396/436; 348/64; 348/240.1; 348/333.09; 348/333.12; 348/341; 358/909.1

(58) Field of Classification Search .................. 396/84, 396/141, 148, 380, 373, 374, 311, 6, 435, 396/436, 378, 379, 429; 348/240.3, 333.01, 348/333.02, 333.03, 333.11, 333.12, 341, 348/333.08, 333.09, 64, 220.1, 240.99, 240.1, 348/240.2; 358/909.1, 906

See application file for complete search history.

(56) References Cited

U.S. PATENT DOCUMENTS

| 3,971,065 A | 7/1976 | Bayer | 348/276 |
| 4,642,678 A | 2/1987 | Cok | 348/242 |
| 4,685,143 A | 8/1987 | Choate | 382/170 |
| 4,955,064 A | 9/1990 | Shirasaka et al. | 382/242 |

(Continued)

FOREIGN PATENT DOCUMENTS

| JP | 2001/116985 | 10/1999 |
| WO | WO 01/26021 | 4/2001 |
| WO | WO 01/71636 | 9/2001 |
| WO | WO 02/27640 | 4/2002 |

*Primary Examiner*—Judy Nguyen
*Assistant Examiner*—Rochelle Blackman
(74) *Attorney, Agent, or Firm*—Roland R. Schindler, II

(57) ABSTRACT

A camera adjusts the aspect ratio of a viewfinder image. The camera has a body and a capture unit mounted in the body. The capture unit has an imager and storage media operatively connected to the imager. The capture unit selectively captures an electronic image of a scene. A viewfinder of the camera displays a light image of the scene. A cropper is disposed in the body. The cropper is switchable among a plurality of settings. Each setting defines a different rectangular cross-sectioned window in the viewfinder. A cropping control is operatively connected to the capture unit and cropper. The cropping control has a cropping input element that is accessible external to the body. The cropping input element is movable between first and second opposed cropping control positions to change the settings. The cropping control positions define a cropping control axis perpendicular to an optical axis of the capture unit.

22 Claims, 30 Drawing Sheets

U.S. PATENT DOCUMENTS

| | | | |
|---|---|---|---|
| 4,969,202 A | 11/1990 | Groezinger | 382/199 |
| 5,001,507 A | 3/1991 | Iida et al. | 348/333.03 |
| 5,016,107 A | 5/1991 | Sasson et al. | 348/231.1 |
| 5,081,689 A | 1/1992 | Meyer et al. | 382/199 |
| 5,103,254 A | 4/1992 | Bell et al. | 396/147 |
| 5,142,380 A | 8/1992 | Sakagami et al. | 382/250 |
| 5,150,143 A | 9/1992 | Ohno et al. | 396/60 |
| 5,172,234 A | 12/1992 | Arita et al. | 348/240.2 |
| 5,227,824 A | 7/1993 | Yoshida et al. | 396/60 |
| 5,266,985 A | 11/1993 | Takagi | 396/147 |
| 5,361,119 A | 11/1994 | Shida et al. | 396/121 |
| 5,373,322 A | 12/1994 | Laroche et al. | 348/273 |
| 5,389,988 A | 2/1995 | Daitoku | 396/60 |
| 5,404,189 A | 4/1995 | Labaziewicz et al. | 396/379 |
| 5,440,369 A | 8/1995 | Tabata et al. | 396/72 |
| 5,444,798 A | 8/1995 | Enomoto et al. | 382/199 |
| 5,446,804 A | 8/1995 | Allebach et al. | 382/298 |
| 5,455,654 A | 10/1995 | Suzuki | 396/123 |
| 5,477,264 A | 12/1995 | Sarbadhikari et al. | 348/231.6 |
| 5,486,893 A | 1/1996 | Takagi | 396/147 |
| 5,496,106 A | 3/1996 | Anderson | 348/255 |
| 5,548,327 A | 8/1996 | Gunday et al. | 348/97 |
| 5,557,328 A | 9/1996 | Ishihama et al. | 348/240.3 |
| 5,557,358 A | 9/1996 | Mukai et al. | 396/296 |
| 5,563,655 A | 10/1996 | Lathrop | 348/231.9 |
| 5,563,718 A | 10/1996 | Wober et al. | 382/250 |
| 5,583,593 A | 12/1996 | Terada | 396/435 |
| 5,619,265 A | 4/1997 | Suzuki et al. | 348/362 |
| 5,619,738 A | 4/1997 | Petruchik et al. | 396/311 |
| 5,634,040 A | 5/1997 | Her et al. | 345/629 |
| 5,663,759 A | 9/1997 | Horng et al. | 348/222.1 |
| 5,666,215 A | 9/1997 | Fredlund et al. | 358/487 |
| 5,666,566 A | 9/1997 | Gu et al. | 396/80 |
| 5,668,597 A | 9/1997 | Parulski et al. | 348/350 |
| 5,675,358 A | 10/1997 | Bullock et al. | 345/420 |
| 5,675,400 A | 10/1997 | Stephenson, III | 355/40 |
| 5,697,001 A | 12/1997 | Ring et al. | 396/121 |
| 5,706,049 A | 1/1998 | Moghadam et al. | 348/333.03 |
| 5,710,954 A | 1/1998 | Inoue | 396/374 |
| 5,715,483 A | 2/1998 | Omata et al. | 396/80 |
| 5,734,425 A | 3/1998 | Takizawa et al. | 348/231.9 |
| 5,742,233 A | 4/1998 | Hoffman et al. | 340/573.1 |
| 5,743,609 A | 4/1998 | Bauer et al. | 353/25 |
| 5,754,230 A | 5/1998 | Tsuruta | 348/333.12 |
| 5,760,917 A | 6/1998 | Sheridan | 358/442 |
| 5,765,045 A | 6/1998 | Takagi et al. | 396/51 |
| 5,796,428 A | 8/1998 | Matsumoto et al. | 348/207.99 |
| 5,822,625 A | 10/1998 | Leidig et al. | 396/77 |
| 5,828,406 A | 10/1998 | Parulski et al. | 348/220.1 |
| 5,845,166 A | 12/1998 | Fellegara et al. | 396/429 |
| 5,874,994 A | 2/1999 | Xie et al. | 348/349 |
| 5,877,809 A | 3/1999 | Omata et al. | 348/345 |
| 5,892,991 A | 4/1999 | Hamada et al. | 396/147 |
| 5,897,232 A * | 4/1999 | Stephenson et al. | 396/380 |
| 5,898,779 A | 4/1999 | Squilla et al. | 713/176 |
| 5,909,598 A | 6/1999 | Kadohara | 396/296 |
| 5,930,539 A | 7/1999 | Tanaka | 396/378 |
| 5,933,137 A | 8/1999 | Anderson | 345/720 |
| 5,940,121 A | 8/1999 | Mcintyre et al. | 348/64 |
| 5,943,050 A | 8/1999 | Bullock et al. | 345/783 |
| 5,966,553 A | 10/1999 | Nishitani et al. | 396/303 |
| 5,973,734 A | 10/1999 | Anderson | 348/239 |
| 5,978,016 A | 11/1999 | Lourette et al. | 348/64 |
| 6,004,061 A | 12/1999 | Manico et al. | 402/79 |
| 6,005,613 A | 12/1999 | Endsley et al. | 348/231.6 |
| 6,018,362 A | 1/2000 | Suzuki et al. | 348/220.1 |
| 6,020,920 A | 2/2000 | Anderson | 348/222.1 |
| 6,058,248 A | 5/2000 | Atkins et al. | 358/1.2 |
| 6,061,523 A | 5/2000 | Kim | 396/60 |
| 6,067,114 A | 5/2000 | Omata et al. | 348/345 |
| 6,072,586 A | 6/2000 | Bhargava et al. | 358/1.15 |
| 6,075,926 A | 6/2000 | Atkins et al. | 358/1.2 |
| 6,092,023 A | 7/2000 | Kunishige | 702/1 |
| 6,137,534 A | 10/2000 | Anderson | 348/222.1 |
| 6,167,469 A | 12/2000 | Safai et al. | 710/62 |
| 6,188,432 B1 | 2/2001 | Ejima | 348/240.99 |
| 6,195,511 B1 | 2/2001 | Harada | 396/300 |
| 6,205,296 B1 * | 3/2001 | Hamada et al. | 396/311 |
| 6,215,523 B1 | 4/2001 | Anderson | 348/333.05 |
| 6,229,566 B1 | 5/2001 | Matsumoto et al. | 348/231.2 |
| 6,252,989 B1 | 6/2001 | Geisler et al. | 382/232 |
| 6,256,061 B1 | 7/2001 | Martin et al. | 348/222.1 |
| 6,259,857 B1 | 7/2001 | Miyahara et al. | 386/68 |
| 6,266,085 B1 | 7/2001 | Kato et al. | 348/211.7 |
| 6,269,357 B1 | 7/2001 | Nakayama et al. | 707/1 |
| 6,275,260 B1 | 8/2001 | Anderson | 348/239 |
| 6,282,231 B1 | 8/2001 | Norman et al. | 375/144 |
| 6,282,317 B1 | 8/2001 | Luo et al. | 382/203 |
| 6,287,252 B1 | 9/2001 | Lugo | 600/300 |
| 6,294,993 B1 | 9/2001 | Calaman | 340/534.18 |
| 6,345,274 B1 | 2/2002 | Zhu et al. | 707/5 |
| 6,381,412 B1 | 4/2002 | Funahashi et al. | 396/60 |
| 6,438,323 B1 | 8/2002 | DeCecca et al. | 396/6 |
| 6,477,333 B1 | 11/2002 | Manabe et al. | 396/380 |
| 6,505,003 B1 | 1/2003 | Malloy Desormeaux | 396/429 |
| 6,516,154 B1 | 2/2003 | Parulski et al. | 396/287 |
| 6,577,821 B1 | 6/2003 | Malloy Desormeaux | 396/374 |
| 6,738,577 B1 * | 5/2004 | Maeda et al. | 396/287 |
| 2002/0019584 A1 | 2/2002 | Schulze et al. | 600/300 |
| 2002/0076100 A1 | 6/2002 | Luo | 382/164 |
| 2003/0117511 A1 | 6/2003 | Belz et al. | 348/333.11 |

* cited by examiner

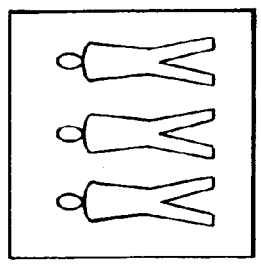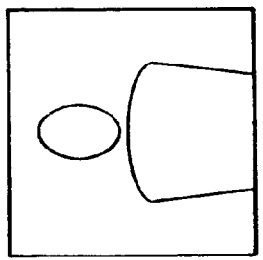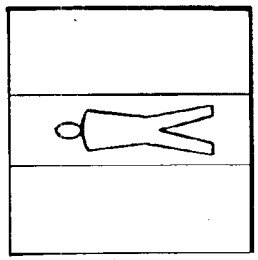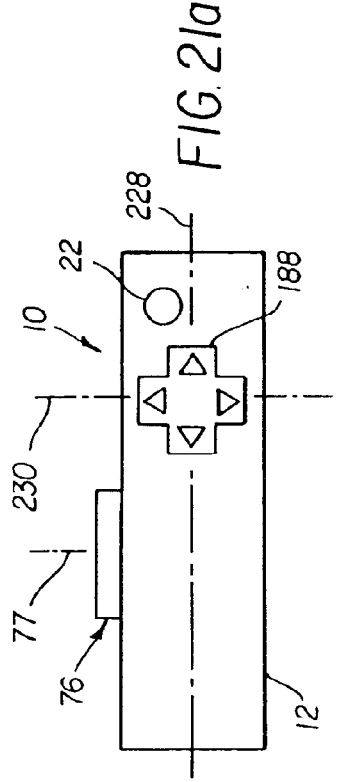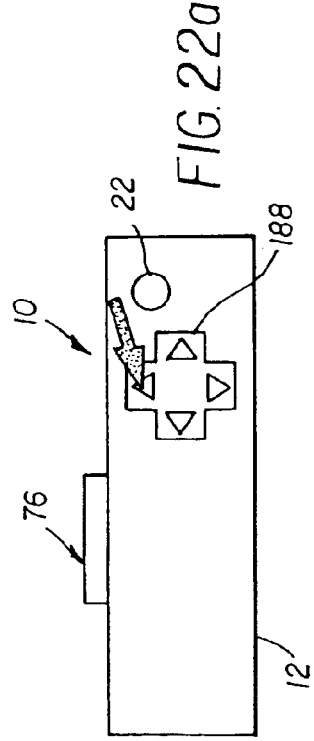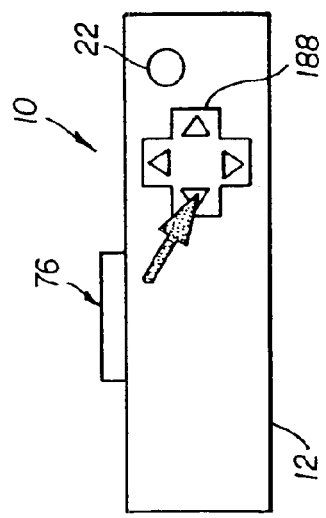

USER INTERFACE FOR CONTROLLING CROPPING IN ELECTRONIC CAMERA

CROSS REFERENCE TO RELATED APPLICATIONS

Reference is made to commonly assigned, co-pending U.S. patent application Ser. No. 10/292,684, entitled: CAMERA HAVING CONTINUOUSLY CROPPING VIEWFINDER, filed 12 Nov. 2002 in the name of Randolph C. Brost.

FIELD OF THE INVENTION

The invention relates to cameras and photography and more particularly relates to a user interface for controlling cropping in an electronic camera.

BACKGROUND OF THE INVENTION

Photographers have been zooming and cropping photographic images, after capture, since the beginnings of photography. With the availability of zoom taking lenses, viewfinder reticles and masks have been used to show the effects of zooming in the viewfinder, before capture. Zoom viewfinders and digital viewfinders are now generally used to present zoomed light images prior to capture.

Viewfinders that show possible changes in aspect ratio prior to capture have been less common. (For convenience, in the following, the term "cropping" is used to refer only to changes in an image that alter the aspect ratio and "zooming" is used to refer only to changes in an image that alter the relative size, but retain the same aspect ratio.) Some Advanced Photo System™ ("APS") cameras have had viewfinders that showed available cropping (print aspect ratios). In those cameras, the entire film frame is exposed, an encodement is recorded on the film, and the image is printed in the selected aspect ratio at photofinishing. These approaches are more convenient than cropping after printing, since the user can compose the image based upon a desired final aspect ratio seen in the viewfinder, but these approaches are limited to a few preset cropping values (aspect ratios). The user interface for controlling cropping in these cameras has been very simple, since the available cropping states are very small in number.

U.S. Pat. No. 5,619,738 discloses a hybrid camera, in which the user can edit an image on a display on the back of the camera. The user selects a print format and then moves a marker on the display to zoom, crop, and/or tilt the desired portion of the image. This approach is effective, but is again complex. The image is shown on the display along with marks that define a box showing the size of the edited image. The box is enlarged or reduced in size to indicate zooming. An input element is moved from side to side to effect zooming. The box is moved in left-right and up-down directions to crop, using input elements that move from side to side and up and down, respectively. U.S. Pat. No. 5,675,400 discloses an editor for processed film images that similarly presents a box on a displayed image. The box is zoomed, moved left-right, and moved up-down by three rotatable knobs arranged in a column. The devices disclosed in these patents provide many different cropping and zooming values. On the other hand, the input elements provided for the zooming and cropping functions, are not easily differentiated without looking at them. In U.S. Pat. No. 5,619,738, zooming and left-right movement are provided by adjoining left-right movable input elements. In U.S. Pat. No. 5,675,400, zooming and box movements are provided by rotary knobs. The user must look or remember which knob provides what function. This is not a particular problem for editing images after capture, but would be a hindrance during composition prior to capture.

It would thus be desirable to provide an improved camera and method in which input elements are easily and conveniently used to change cropping during composition, prior to image capture.

SUMMARY OF THE INVENTION

The invention is defined by the claims. The invention, in its broader aspects, provides a camera that adjusts the aspect ratio of a viewfinder image. The camera has a body and a capture unit mounted in the body. The capture unit has an imager and storage media operatively connected to the imager. The capture unit selectively captures an electronic image of a scene. A viewfinder of the camera displays a light image of the scene. A cropper is disposed in the body. The cropper is switchable among a plurality of settings. Each setting defines a different rectangular cross-sectioned window in the viewfinder. A cropping control is operatively connected to the capture unit and cropper. The cropping control has a cropping input element that is accessible external to the body. The cropping input element is movable between first and second opposed cropping control positions to change the settings. The cropping control positions define a cropping control axis perpendicular to an optical axis of the capture unit.

It is an advantageous effect of the invention that an improved camera and method are provided in which input elements are easily and conveniently used to change cropping during composition, prior to image capture. This allows the photographer to adjust the view position and direction in response to cropping considerations.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIG. 21a is top view of the camera of FIG. 1. The four way zoom-crop input element is shown in a default or normal zoom position and center intermediate cropper vane position.

FIG. 21b is a diagrammatical view of a viewfinder image provided by the camera of FIG. 21a.

FIG. 22a is the same view as FIG. 21a, but an arrow is added to indicate the effect of a user holding down the forward pad of the four way zoom-crop input element. In the camera of FIG. 21a, the cropping and zooming input elements continuously change respective cropper and zoom mechanism positions, as long as the respective pad is pressed and held down. Thus, in FIGS. 22a–25 respective limit positions are shown.

FIG. 22b is a diagrammatical view of the viewfinder image provided by the camera of FIG. 22a following zooming of the viewfinder image responsive to the user action of FIG. 22a.

FIG. 23a is the same view as FIG. 21a, but an arrow is added to indicate the effect of a user holding down the leftward pad of the four way zoom-crop input element.

FIG. 23b is a diagrammatical view of the viewfinder image provided by the camera of FIG. 22a following cropping of the viewfinder image responsive to the user action of FIG. 22a.

FIG. 24b is a diagrammatical view of the viewfinder image provided by the camera of FIG. 21a following cropping of the viewfinder image responsive to the user action of FIG. 24a.

FIG. 25b is a diagrammatical view of the viewfinder image provided by the camera of FIG. 21a following zooming of the viewfinder image responsive to the user action of FIG. 25a.

DETAILED DESCRIPTION OF THE INVENTION

Figure 1:
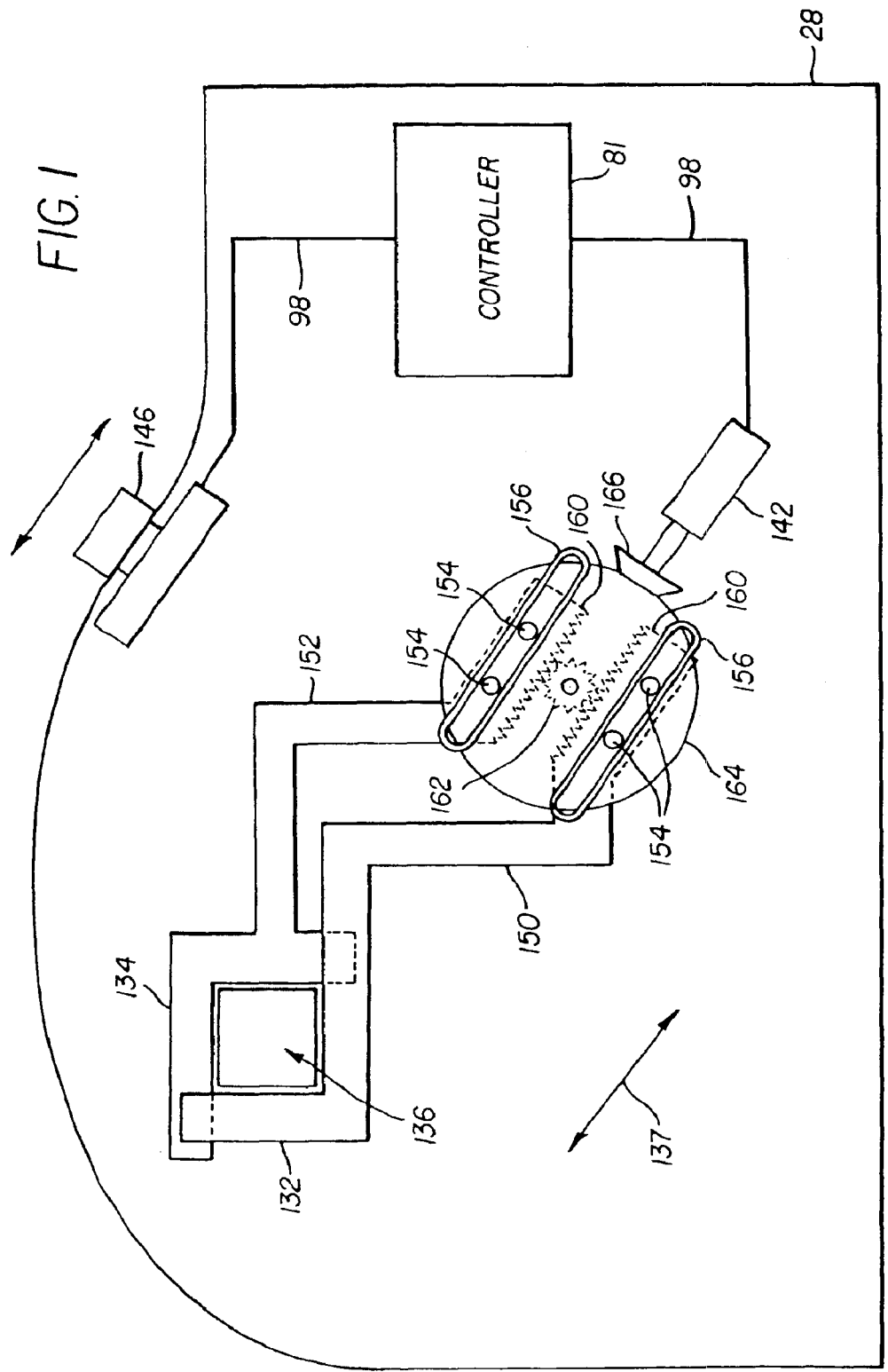
FIG. 1 is a semi-diagrammatical view of an embodiment of the camera. For clarity, only the front cover, cropper, controller, and signal lines are shown. The cropper is shown in a center intermediate vane position. In this and other drawings, the overlap of some parts is indicated by dashed lines. For clarity, solid lines are retained for other overlaps.
Figure 2:
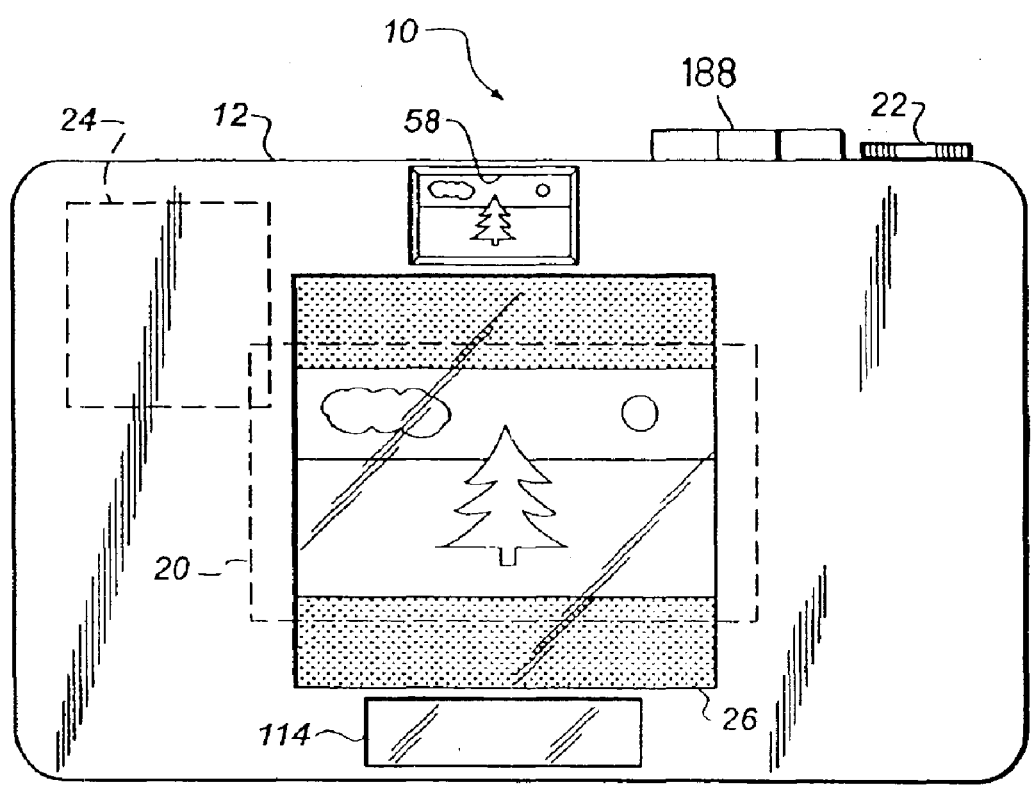
FIG. 2 is a rear view of another embodiment of the camera.
Figure 3:
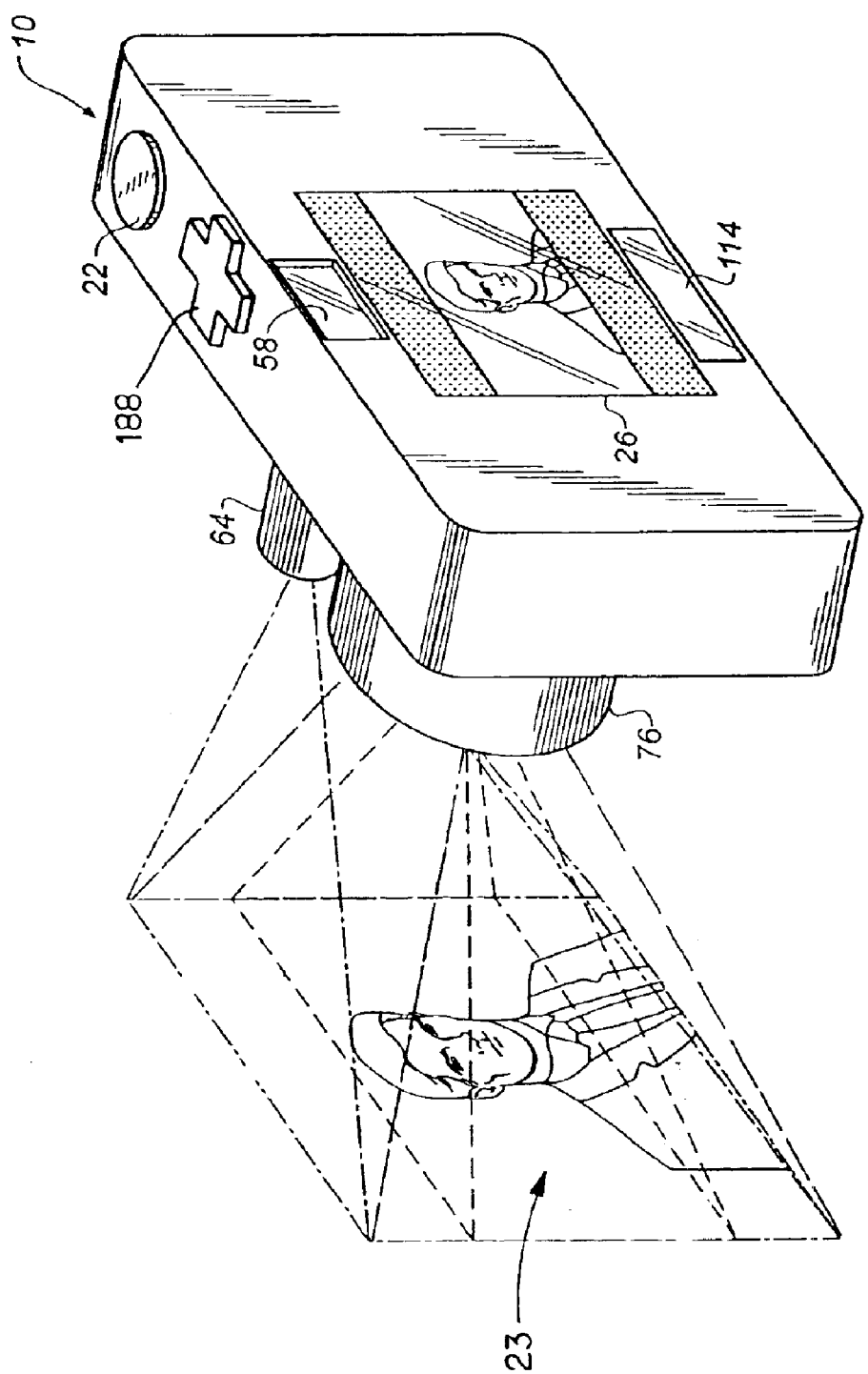
FIG. 3 is a semi-diagrammatical rear perspective view of the camera of FIG. 2. The camera is shown with the display in use as an electronic viewfinder.

The camera provides the photographer with a single input element that provides for continuous adjustment of image aspect ratio, while providing an immediate view of the resulting selected image boundaries during composition. In particular embodiments, zoom control is provided by the same, or an adjoining input element. In particular embodiments disclosed herein, the aspect ratio of the image in an optical viewfinder is altered by mechanical vanes. An archival image captured at picture taking, is subject to cropping or cropping information is provided, based on the position of the vanes. This approach is especially well-suited to a digital camera or hybrid film-digital camera, but is also applicable to film cameras as well.

In the following, feature sets of the several different cameras and methods are discussed in terms of particular embodiments combining all or many of those features. Alternative embodiments combining fewer features and alternative features are also discussed herein. Other alternatives will be apparent to those of skill in the art. Viewfinder location in the cameras shown is selected for clarity of the drawings. In an actual camera, viewfinder location may differ. The camera is discussed below, generally in terms of a hybrid film-digital camera or a digital still camera. Like considerations apply to digital video cameras and film only cameras.

Referring now particularly to FIGS. 1–9 and 35, in particular embodiments, the camera 10 has a body 12 that holds a capture system having an archival image capture unit 16 and a evaluation capture unit 18. The two different capture units 16,18 can take a variety of forms and can be completely separate from each other or can share some or most components. The evaluation capture unit 18 captures a scene image electronically and can also be referred to as an electronic image capture unit 18. The archival image capture unit 16 can capture images electronically or on film. If the archival image capture unit 16 captures latent images using photographic film as the archival media, it is referred to herein as a "film image capture unit 20".

In an embodiment of the camera 10 having a film image capture unit 20, when the photographer trips a shutter release 22, a subject image 23 (a light image of a scene) is captured as a latent image on a frame of the film 41 and at least one electronic image is captured on an electronic array imager 24 of the evaluation capture unit 18. The electronic image or images are digitally processed and used to provide one or more derived images that can be shown on an image display 26 mounted to the body 12. The electronic images, as captured in analog form and after digitization, but not other modification, are referred to generically herein as "original electronic images". After further modification, inclusive of any zooming and cropping, the electronic images are referred to generically herein by the term "derived images". Derived images are also modified relative to the original images for calibration to the display or a particular file structure, or matching to particular presets, such as output media to be used for a final image. These modifications may or may not also include the addition of metadata. With a hybrid camera, a derived image that is matched to the expected product of photofinishing a film archival image is also referred to herein as a "verification image". More than one derived image can be made from a single original electronic image. A derived image that is used for a digital viewfinder, rather than as a digital archival image, is referred to herein as an "evaluation image".

The camera body 12 provides structural support and protection for the capture units 16,18 and other components. The body 12 of the camera 10 can be varied to meet requirements of a particular use and style considerations. It is convenient, if the body 12 has front and rear covers 28,30 joined together over a chassis 32. Many of the components of the camera 10 can be mounted to the chassis 32. A film door 34 and a flip-up flash unit 36 are pivotably joined to the covers 28,30 and chassis 32.

The film image capture unit 20 has a film holder 38 that holds a film unit 40 during use. In the camera 10 of FIGS. 7–8, the film holder 38 is part of the chassis 32. (The term "film unit" is used to refer to photographic film and any accompanying canister or other support structure or light block, or the like.)

The configuration of the film holder 38 is a function of the type of film unit 40 used. The type of film unit 40 used is not critical. The camera 10 shown in the figures is film reloadable and uses an Advanced Photo System ("APS") film cartridge. Other types of one or two chamber film cartridge could also be used and roll film can also be used. It is currently preferred that the camera 10 is reloadable. The camera 10 can have a IX–DX code reader (not shown) to determine the film type and a data recorder 39 to write data on the film indicating how many prints of each film frame to produce, print format, and the like. This is not limiting. Information including metadata can be read and written by any means well known to those of skill in the art.

The film holder 38 includes a pair of film chambers 42,44 and an exposure frame 45 between the film chambers 42,44. The film unit 40 has a canister 46 disposed in one of the chambers. A filmstrip 41 is wound around a spool 48 held by the canister 46. During use, the filmstrip 41 extends across the exposure frame 45 and is wound into a film roll in the other chamber. The exposure frame 45 has an opening 50 through which a light image exposes a frame of the film 41 at each picture-taking event.

During use, the filmstrip 41 is moved by a film transport 52 out of the canister 46 of the film cartridge 40, is wound into a film roll in the supply chamber 42, and is then returned to the canister 46. The film transport 52, as illustrated, includes an electric motor located within a supply spool 49, but other types of motorized transport mechanisms and manual transports can also be used. Filmstrip exposure can be on film advance or on rewind.

The electronic image capture unit 18 has an electronic array imager 24. The electronic array imager 24 is configured so as to capture, for each picture-taking event, one or more electronic images that correspond to a latent image concurrently captured on the filmstrip 41. The type of imager 24 used may vary, but it is highly preferred that the imager 24 be one of the several solid-state imagers available. One highly popular type of solid-state imager commonly used is the charge-coupled device ("CCD"). Of the several CCD types available, two allow easy electronic shuttering and thereby are preferable in this use. The first of these, the frame transfer CCD, allows charge generation due to photoactivity, and then shifts all of the image charge into a light shielded, non-photosensitive area. This area is then clocked out to provide a sampled electronic image. The second type, the interline transfer CCD, also performs shuttering by shifting the charge, but shifts charge to an area above or below each image line so that there are as many storage areas as there are imaging lines. The storage lines are then shifted out in an appropriate manner. Each of these CCD imagers has both advantages and disadvantages, but all will work in this application. A typical CCD has separate components that act as clock drivers, analog signal processor-analog/digital converter 104 (also referred to as "A/D converter 104"). It is also possible to use an electronic image sensor manufactured with CMOS technology. This type of imager is attractive for use, since it is manufactured easily in a readily available solid-state process and lends itself to use with a single power supply. In addition, the process allows peripheral circuitry to be integrated onto the same semiconductor die. For example, a CMOS sensor can include clock drivers, the A/D converter, and other components integrated on a single IC. A third type of sensor, which can be used, is a charge injection device (CID). This sensor differs from the others mentioned in that the charge is not shifted out of the device to be read. Reading is accomplished by shifting charge within the pixel. This allows a nondestructive read of any pixel in the array. If the device is externally shuttered, the array can be read repeatedly without destroying the image. Shuttering can be accomplished by external shutter or, without an external shutter, by injecting the charge into the substrate for recombination.

The electronic image capture unit 18 captures a three-color image. It is highly preferred that a single imager be used along with a three-color or four color filter, however, multiple monochromatic imagers and filters can be used. Suitable three-color filters are well known to those of skill in the art, and are normally incorporated with the imager to provide an integral component. For convenience, the camera is generally discussed herein in relation to embodiments having a single imager with a three color filter (not separately illustrated). It will be understood that like considerations apply to cameras using more than three colors as well as cameras using multiple monochromatic imagers.

Figure 9:
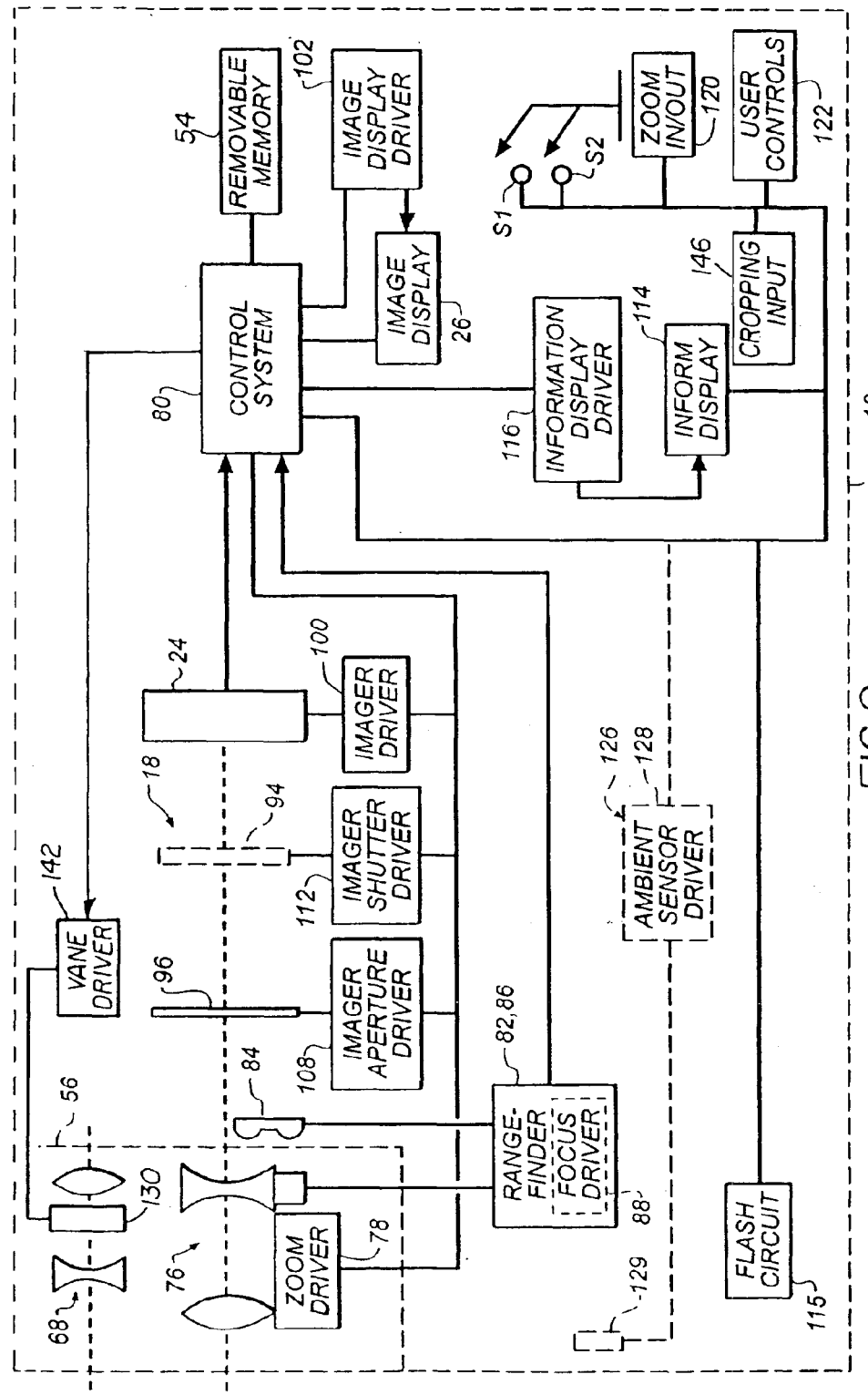
FIG. 9 is a schematic diagram of another embodiment of the camera.

Referring to FIG. 9, in some embodiments the archival image capture unit is an electronic image capture unit 18 that captures the archival image electronically and stores the archival image in digital form. In this latter case, the "capture media" is digital storage media, such as electronic or magnetic memory and the archival images are transferred in digital form for photofinishing. The memory 54 may be fixed in the camera 10 or removable. The type of memory used and the manner of information storage, such as optical or magnetic or electronic, is not critical. For example, removable memory can be a floppy disc, a CD, a DVD, a tape cassette, or flash memory card or stick. The transfer of images in digital form can be on physical media or as a transmitted electronic signal.

Two electronic capture units 16,18 can be present in the camera 10, with one used as the evaluation capture unit 18 and the other used as the archival capture unit. An example of a suitable digital camera having two such electronic capture units is described in U.S. Pat. No. 5,926,218, entitled "ELECTRONIC CAMERA WITH DUAL RESOLUTION SENSORS", to Smith. Alternatively, a single electronic capture unit can be used as both the evaluation capture unit and the archival image capture unit. In this case, the archival image is derived from the original electronic image by an archival image definition unit and the scene is defined by the effective field of view resulting from this operation. With a fully electronic camera 10, the derived images can be subsampled from the original electronic image so as to provide lower resolution derived images. The lower resolution derived images can be provided using the method described in commonly-assigned U.S. Pat. No. 5,164,831, entitled "ELECTRONIC STILL CAMERA PROVIDING MULTI-FORMAT STORAGE OF FULL AND REDUCED RESOLUTION IMAGES", to Kuchta, et al.

The camera 10 can alternatively allow use of either a film image capture unit 20 or an electronic capture unit as the archival image capture unit 16, at the selection of the photographer or on the basis of available storage space in one or another capture media or on some other basis. For example, a switch (not separately illustrated) can provide alternative film capture and electronic capture modes. The camera 10 otherwise operates in the same manner as the other described embodiments.

Figure 4:
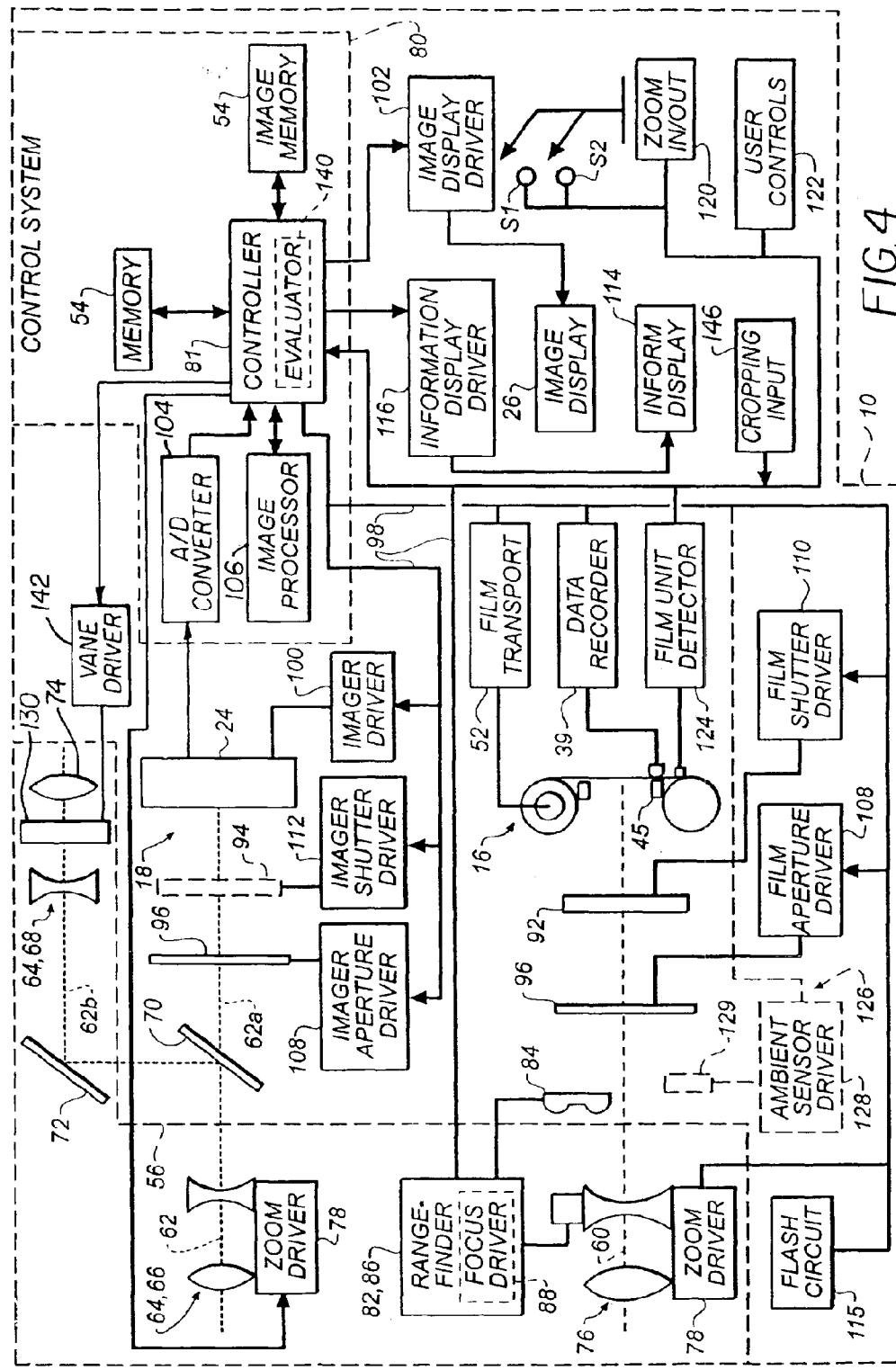
FIG. 4 is a schematic diagram of the camera of FIG. 2.
Figure 5:
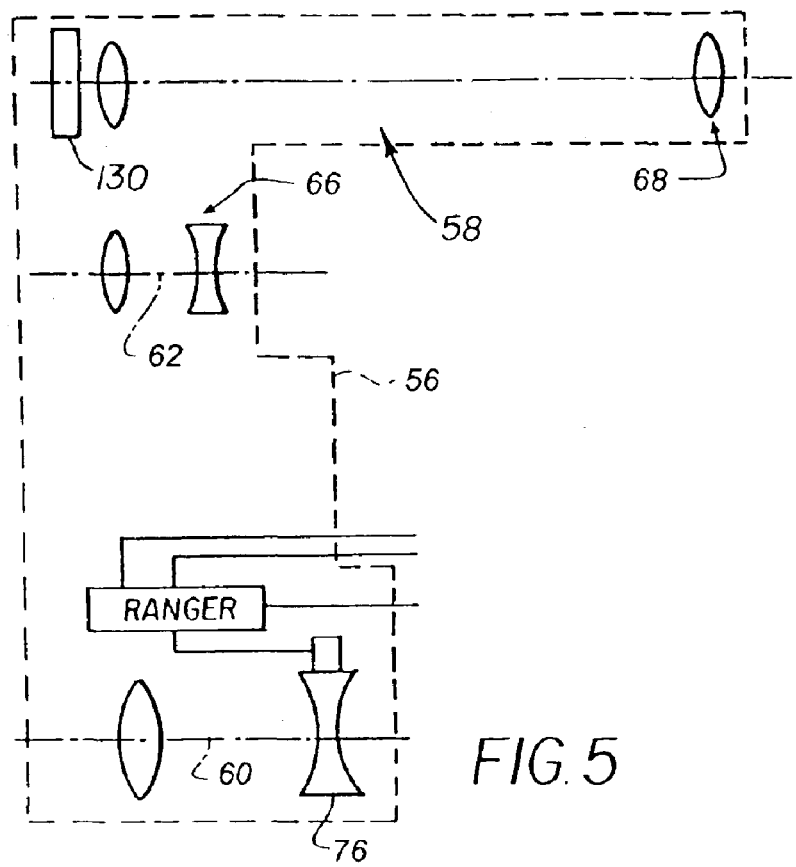
FIG. 5 is a partial schematic diagram of a modification of the camera of FIG. 2.
Figure 6:
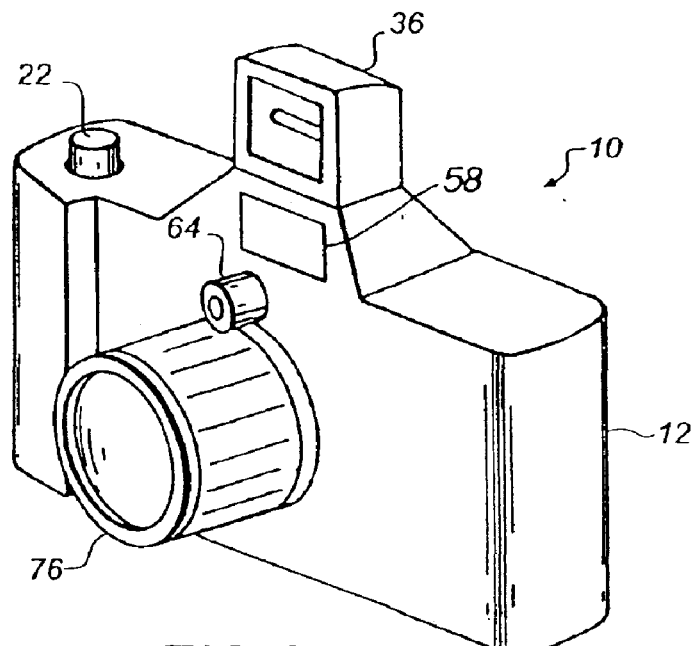
FIG. 6 is a front perspective view of the camera of FIG. 5.
Figure 7:
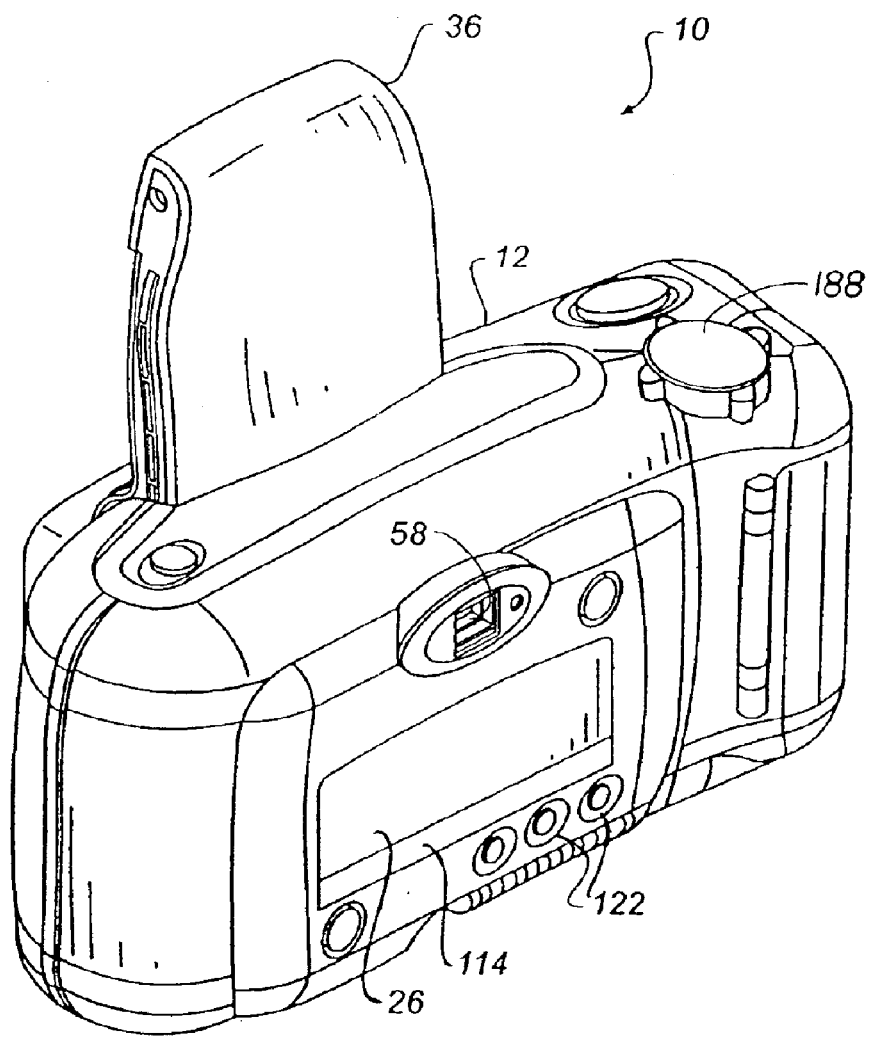
FIG. 7 is a rear perspective view of a modification of the camera of FIG. 2.
Figure 8:
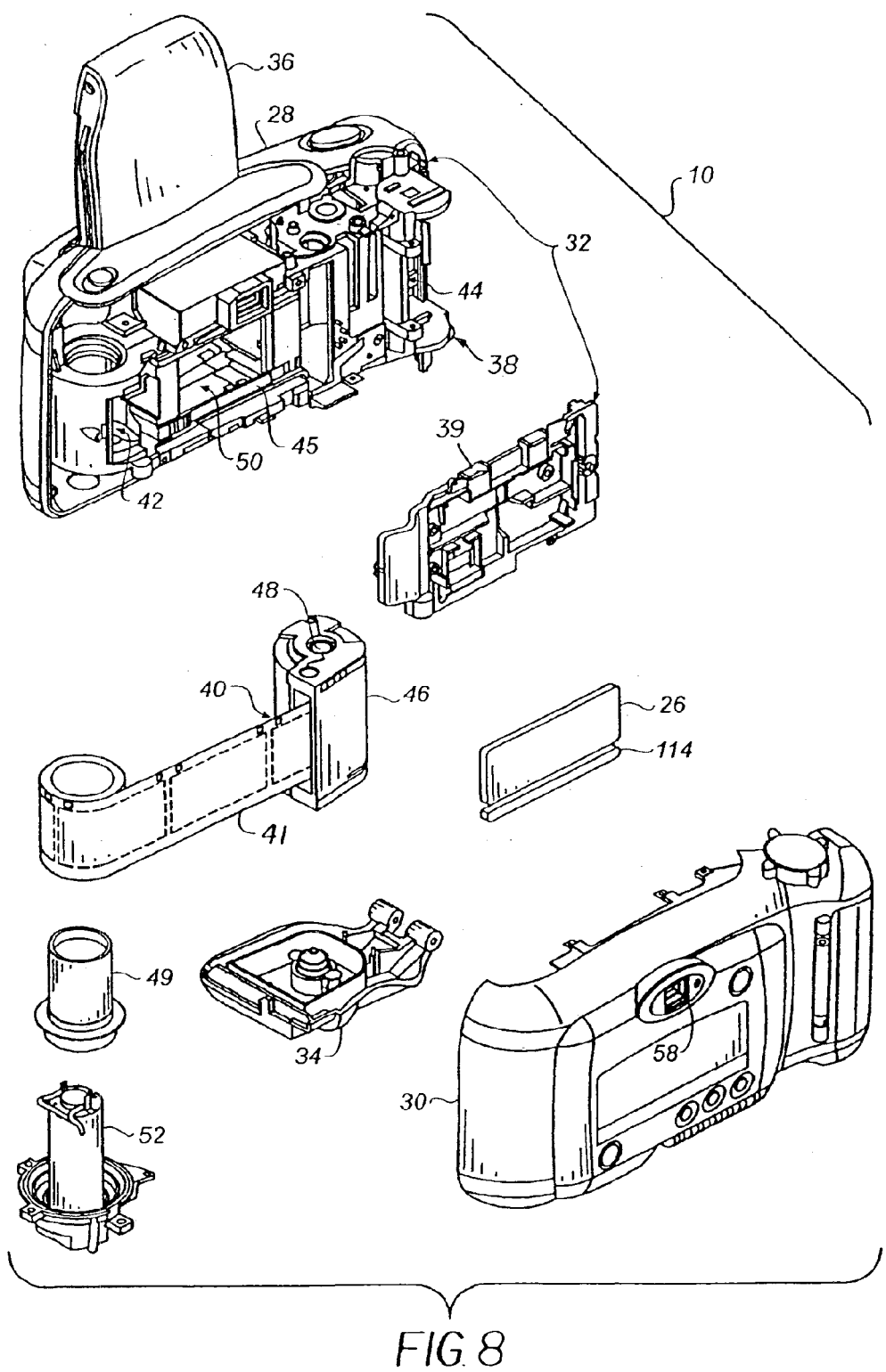
FIG. 8 is an exploded rear perspective of the camera of FIG. 7.
Figure 35:
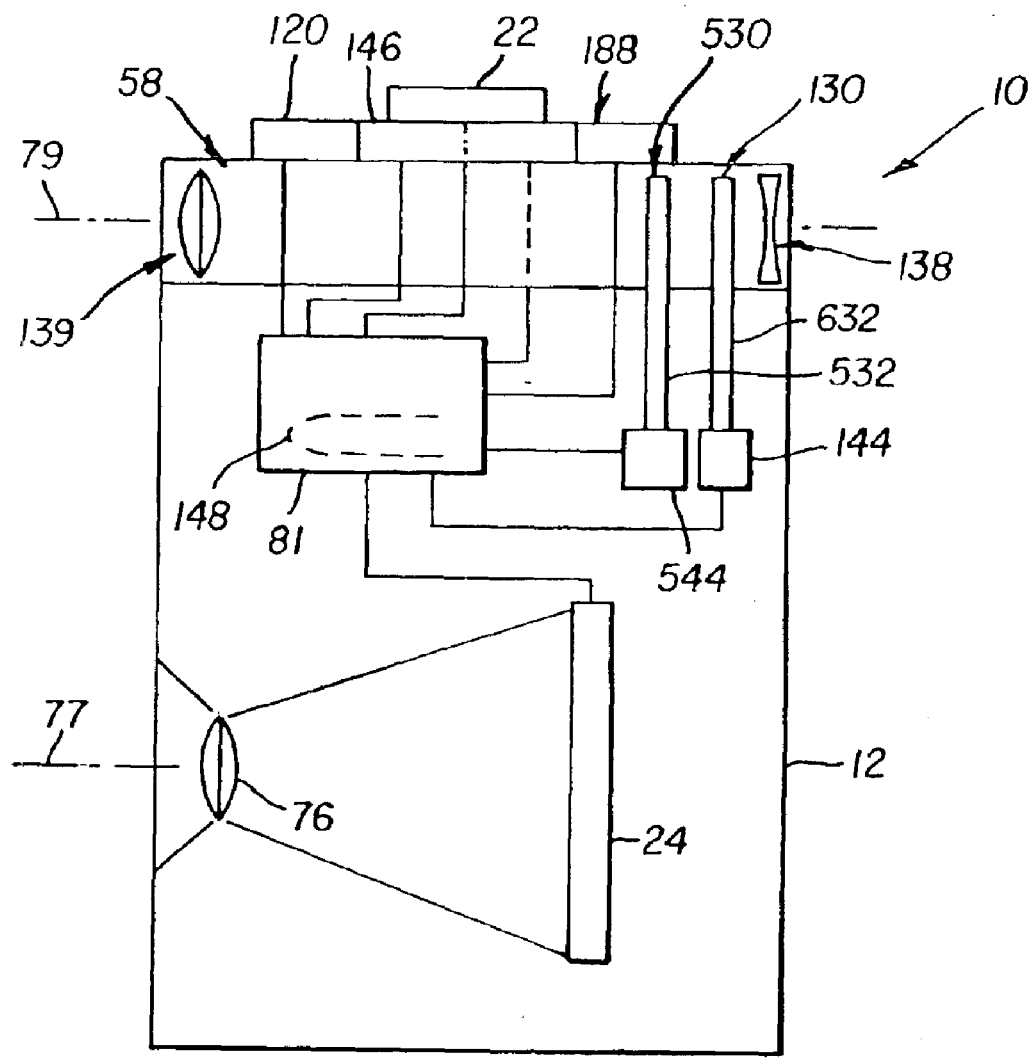
FIG. 35 is a diagrammatical cross-section of another embodiment of the camera.

Referring now primarily to FIGS. 4–5, 9, and 35 the camera 10 has an optical system 56 of one or more lenses mounted in the body 12. The optical system 56 is illustrated in FIGS. 4–5 and 9 by a dashed line and several groups of lens elements. It will be understood that this is illustrative, not limiting. The optical system 56 directs light to the exposure frame 45 (if present) and to the electronic array imager 24. The optical system 56 also preferably directs light through an optical viewfinder 58 to the user. Referring to FIG. 35, the taking lens unit 76 defines an optical axis 77. The viewfinder lens unit 68 defines a viewfinder axis 79. The taking lens 76 and viewfinder lens 68 define a capture light path and a viewfinder light path, respectively.

Referring to FIGS. 4–5, in hybrid embodiments, the imager 24 is spaced from the exposure frame 45; thus, the optical system 56 directs light along a first path (indicated by a dotted line 60) to the exposure frame 45 and along a second path (indicated by a dotted line 62) to the electronic array imager 24. Both paths 60,62 converge at a position in front of the camera 10, at the plane of the subject image 23. In FIG. 4, the optical system 56 has a combined lens unit 64 that includes both an imager lens unit 66 and a viewfinder lens unit 68. The combined lens unit 64 has a partially transmissive mirror 70 that subdivides the second light path 62 between an imager 24 subpath 62a to the imager 24 and a viewfinder subpath 62b that is redirected by a fully reflective mirror 72 and transmitted through an eyepiece 74 to the photographer.

The optical system 56 can be varied. For example, the viewfinder lens unit 68, imager lens unit 66, and a taking lens unit 76 can be fully separate, as shown in FIG. 5, or a combined lens unit can include both a taking lens unit and an imager 24 lens unit (not shown). Other alternative optical systems can also be provided.

In most cameras 10, there is a variation between the field of view of the viewfinder 58 and the field of view of the archival image capture unit 16. The scene delineated by the viewfinder 58 is typically 80 to 95 percent of the field of view of the archival image capture unit 16. The difference ensures that everything the photographer sees will be captured in the archival image, albeit with some additional image content at the edges. Cameras 10 are generally described and illustrated herein in terms of viewfinders 58 that have a 100 percent match to the field of view of the archival image capture unit 16. This is a matter of convenience in describing the invention. The viewfinders 58 of the cameras 10 can be limited to 80 to 95 percent of the field of view of the archival image capture unit 16 without changing the other features described.

Referring again to the embodiment shown in FIG. 4, the taking lens unit 76 is a motorized zoom lens in which a mobile element or elements are driven, relative to a stationary element or elements, by a zoom driver 78. The combined lens unit 64 also has a mobile element or elements, driven, relative to a stationary element or elements, by a zoom driver 78. The different zoom drivers 78 are coupled so as to zoom together, either mechanically (not shown) or by a control system 80 signaling the zoom drivers 78 to move the zoom elements of the units over the same or comparable ranges of focal lengths at the same time. The control system 80, which includes a controller 81, can take the form of an appropriately configured microcomputer, such as an embedded microprocessor having RAM or other memory 54 for data manipulation and general program execution.

The taking lens unit 76 of the embodiment of FIG. 4 is also autofocusing. An autofocusing system 82 has a rangefinder 86 that includes a sensor 84. The rangefinder operates a focus driver 88, directly or through the control system 80, to move one or more focusable elements (not separately illustrated) of the taking lens unit 76. The rangefinder 86 can be passive or active or a combination of the two. The taking lens unit 76 can be simple, such as having a single focal length and manual focusing or a fixed focus, but this is not preferred. One or both of the viewfinder lens unit 68 and imager lens unit 66 can have a fixed focal length or one or both can zoom between different focal lengths. Digital zooming (enlargement of a digital image equivalent to optical zooming) can also be used instead of or in combination with optical zooming.

The imager 24 and image display 26 can be used as a viewfinder 58 prior to image capture in place of or in combination with the optical viewfinder 58, as is commonly done with digital still cameras 10. This approach is not currently preferred, since battery usage is greatly increased.

A film shutter 92 shutters the light path to the exposure frame 45. An imager shutter 94 shutters the light path to the imager 24. Diaphragms/aperture plates 96 can also be provided in both of the paths. Each of the shutters 92,94 is switchable between an open state and a closed state. The term "shutter" is used in a broad sense to refer to physical and/or logical elements that provide the function of allowing the passage of light along a light path to a filmstrip or imager 24 for image capture and disallowing that passage at other times. "Shutter" is thus inclusive of, but not limited to, mechanical and electromechanical shutters of all types. "Shutter" is not inclusive of film transports and like mechanisms that simply move film or an imager 24 in and out of the light path. "Shutter" is inclusive of computer software and hardware features of electronic array imagers 24 that allow an imaging operation to be started and stopped under control of the camera controller.

In currently preferred embodiments, the film shutter 92 is mechanical or electromechanical and the imager shutter 94 is mechanical or electronic. The imager shutter 94 is illustrated by dashed lines to indicate both the position of a mechanical imager shutter and the function of an electronic shutter. When using a CCD, electronic shuttering of the imager 24 can be provided by shifting the accumulated charge under a light shielded register provided at a non-photosensitive region. This may be a full frame as in a frame transfer device CCD or a horizontal line in an interline transfer device CCD. Suitable devices and procedures are well known to those of skill in the art. When using a CID, the charge on each pixel is injected into a substrate at the beginning of the exposure. At the end of the exposure, the charge in each pixel is read. The difficulty encountered here is that the first pixel read has less exposure time than the last pixel read. The amount of difference is the time required to read the entire array. This may or may not be significant depending upon the total exposure time and the maximum time needed to read the entire array.

Signal lines 98 electronically connect the various components, for example, connecting the imager 24 through the control system 80 to the image display 26. The imager 24 receives a light image and converts the light image to an analog electrical signal, that is, an analog electronic image. (For convenience, electronic images are generally discussed herein in the singular. Like considerations apply to each image of a plurality captured for a particular picture-taking event.)

The electronic imager 24 is driven by the imager driver 100. The image display 26 mounted on the outside of the camera body 12 is driven by an image display driver 102 and produces a light image (also referred to here as a "display image") that is viewed by the user.

The control system 80 controls other components of the camera 10 and performs processing related to the derived image. The control system 80, as earlier discussed, includes the controller 81 and memory 54 and also includes an A/D converter 104 and an image processor 106. Other components can also be provided, as discussed below, in detail. Suitable components for the control system 80 are known to those of skill in the art. Modifications of the control system 80 are practical, such as those described elsewhere herein. The controller 81 can be provided as a single component, such as a microprocessor, or as multiple components of equivalent function in distributed locations. The same considerations apply to the processor 106 and other components. Likewise, components illustrated as separate units herein may be conveniently combined or shared in some embodiments.

"Memory 54" refers to one or more suitably sized logical units of physical memory provided in semiconductor memory or magnetic memory, or the like. For example, the memory 54 can be an internal memory, such as a Flash EPROM memory, or alternately a removable memory, such as a CompactFlash card, or a combination of both. The controller 81 and image processor 106 can be controlled by software stored in the same physical memory 54 that is used for image storage, but it is preferred that the processor 106 and controller 81 are controlled by firmware stored in dedicated memory 54, for example, in a ROM or EPROM firmware memory. Separate dedicated units of memory 54 can also be provided to support other functions.

The captured analog electronic image is amplified and converted by the analog to digital (A/D) converter-amplifier 104 to a digital electronic image, which is then processed in the image processor 106 and stored in the memory 54. It is currently preferred that the signal lines 98 act as a data bus connecting the imager 24, controller 81, processor 106, the image display 26, and other electronic components.

The controller 81 includes a timing generator (not separately illustrated) that supplies control signals for all electronic components in timing relationship. Calibration values for the individual camera 10 are stored in a calibration memory 54 (not separately illustrated), such as an EEPROM, and supplied to the controller 81. The controller 81 operates the memory or memories 54 and the drivers including the zoom drivers 78, focus driver 88, imager driver 100, image display driver 102, aperture drivers 108, and film and imager shutter drivers 110,112. The controller 81 connects to a flash circuit 115 that mediates flash functions.

It will be understood that the circuits shown and described can be modified in a variety of ways well known to those of skill in the art. It will also be understood that the various features described here in terms of physical circuits can be alternatively provided as firmware or software functions or a combination of the two. Likewise, components illustrated as separate units herein may be conveniently combined or shared in some embodiments.

The digital electronic image stored in memory 54, is accessed by the processor 106, and is modified so as to provide a required derived image. As a part of showing a derived image on the image display 26, the camera 10 may modify the derived image for calibration to the particular display 26. For example, a transform can be provided that modifies each image to accommodate the different capabilities in terms of gray scale, color gamut, and white point of the display 26 and the imager 24 and other components of the electronic capture unit. It is preferred that the display 26 is selected so as to permit all of the derived image to be shown, at an acceptable size and resolution, without requiring panning by the user or other user action; however, more limited displays 26 can be used.

The derived images can also be modified in the same manner that images are commonly enhanced in digital cameras. For example, processing can provide interpolation and edge enhancement. With a verification image in a hybrid digital-film embodiment, enhancements should be limited so as to not render the derived image dissimilar to the corresponding photofinished archival image. If the archival image is an electronic image, then comparable enhancements can be provided for both verification and archival images. Digital processing of an electronic archival image can also include modifications related to file transfer, such as, JPEG compression, and file formatting.

Enhancements can be provided to match the calibrated derived image to output characteristics of a selected photofinishing channel. Photofinishing related adjustments assume foreknowledge of the photofinishing procedures that will be followed for a particular unit of capture media. This foreknowledge can be made available by limiting photofinishing options for a particular capture media unit or by standardizing all available photofinishing or by requiring the user to select a photofinishing choice, for example by entering a character on a control pad or setting a switch. This designation can then direct the usage of particular photofinishing options and can provide for a direct or indirect indication of the effect in a derived image. The application of a designation on a capture media unit could be provided by a number of means known to those in the art, such as application of a magnetic or optical code.

Derived images can be prepared from the electronic image before being needed or as needed, as desired, subject to the limitations of processing speed and available memory. To minimize the size of the memory 54, an electronic image can be processed and stored as a lower resolution image, before a succeeding image is read out from the imager 24.

The controller 81 facilitates the transfers of the image, along the signal lines, between the electronic components and provides other control functions, as necessary. The controller 81 includes a timing generation circuit (not separately illustrated) that produces control signals for all electronic components in timing relationship. The controller 81 is illustrated as a single component, but it will be understood that this is a matter of convenience in illustration. The controller 81 can be provided as multiple components of equivalent function in distributed locations. The same considerations apply to the processor 106 and other components. Likewise, components illustrated as separate units herein may be conveniently combined or shared in some embodiments.

Different types of image display 26 can be used. For example, the image display 26 can be a liquid crystal display ("LCD"), a cathode ray tube display, or an organic electroluminescent display ("OELD"; also referred to as an organic light emitting display, "OLED").

The image display 26 is preferably mounted on the back or top of the body 12, so as to be readily viewable by the photographer. One or more information displays 114 can be provided on the body 12, to present camera information to the photographer, such as exposures remaining, battery state, flash state, number of prints ordered, and the like. For convenience, the information display 114 is generally discussed here in the singular. The information display 114 provides a variety of camera related information and can include a warning message if an archival image will provide an unsuitable quality print or other final image after photofinishing, as discussed below, in detail. The information display 114 and image display 26 can be provided by separate display devices or both can be provided by contiguous parts of a common display device. The information display 114 can be deleted if information is instead provided on the image display 26 as a superimposition on the image or alternately instead of the image (not illustrated). If separate, the information display 114 is operated by an information display driver 116. The image display 26, and an information display 114, can be mounted instead or additionally so as to be viewable through the viewfinder as a virtual display (not shown).

It is preferred that the image display 26 is operated on demand by actuation of a switch (not separately illustrated) and that the image display 26 is turned off by a timer or by initial depression of the shutter release 22. The timer can be provided as a function of the controller 81.

Referring now particularly to FIGS. 4–5, 9, and 35 the camera 10 has user input elements including the shutter release 22, a cropper input element 146, a zooming input element 120, and other user control features 122. (The latter two are discussed in detail below.) The shutter release 22 operates both shutters 92,94. To take a picture, the shutter release 22 is actuated by the user and trips from a set state to an intermediate state, and then to a released state. The shutter release 22 is typically actuated by pushing, and, for convenience the shutter release 22 is generally described herein in relation to a shutter button that is initially depressed through a "first stroke", to actuate a first switch S1 and alter the shutter release 22 from the set state to the intermediate state and is further depressed through a "second stroke", to actuate a second switch S2 and alter the shutter release 22 from the intermediate state to the released state. Like other two stroke shutter releases 22 well known in the art, the first stroke actuates exposure-delimiting camera components, such as autofocus, autoexposure, and flash unit readying; and the second stroke actuates capture of the archival image.

Referring now to FIG. 4, when the shutter release 22 is pressed to the first stroke, the taking lens unit 76 and combined lens unit 64 are each autofocused to a detected subject distance based on subject distance data sent by the rangefinder 86 to the controller 81. The controller 81 also receives data indicating what focal length the lens units 76,64 are set at from one or both of the zoom drivers 78 or a zoom sensor (not shown). The camera 10 also detects the film speed of the film cartridge 40 loaded into the camera 10 using a film unit detector 124 and relays this information to the controller 81. The camera 10 obtains scene brightness (Bv) from components, discussed below, that function as a light meter. The scene brightness and other exposure parameters are provided to an algorithm in the controller 81, which determines a focused distance, shutter speeds, apertures, and optionally a gain setting for amplification of the analog signal provided by the imager 24. Appropriate signals for these values are sent to the drivers 88,100,108,110,112 via a motor driver interface (not shown) of the controller 81. The gain setting is sent to the ASP-A/D converter 104.

The camera 10 assesses ambient lighting using the imager 24 or a separate detector 126 (indicated by dashed lines in the figures) or both. The detector has an ambient detector driver 128 that operates a single sensor 129 or multiple sensors (not shown). The ambient light detector or sensors can receive light from the optical system 56 or can be illuminated external to the optical system 56.

In some embodiments, the evaluation capture unit 18 is used to assess ambient lighting. In those embodiments, one or more electronic images are captured prior to capture of the archival image. The captured electronic image data from one or more of these preliminary images is sampled and scene parameters, such as automatic setting of shutter speeds and diaphragm settings, are determined from that data. These preliminary electronic images can be captured in a continuing sequence as long as the capture system 14 is in a preliminary mode. For example, preliminary images can be captured, seriatim, as long as the shutter release 22 is actuated through the first stroke and is maintained in that position. This capture of preliminary images ends when the shutter release 22 is returned to a stand-by position or is actuated through the second stroke for archival image capture. The preliminary electronic images could be saved to memory 54; but, except as otherwise described here, are ordinarily discarded, one after another, when the replacement electronic image is captured to reduce memory 54 usage. The preliminary images can also be provided to the image display 26 for use by the photographer, prior to picture taking, in composing the picture. This use of the image display 26 as an electronic viewfinder greatly increases energy usage and is not preferred for that reason.

The electronic capture unit is calibrated during assembly, to provide measures of illumination, using known values. For example, the controller 81 can process the data presented in a preliminary image using the same kinds of light metering algorithms as are used for multiple spot light meters. The procedure is repeated for each succeeding preliminary image. Individual pixels or groups of pixels take the place of the individual sensors used in the multiple spot light meters. For example, the controller 81 can determine a peak illumination intensity for the image by comparing pixel to pixel until a maximum is found. Similarly, the controller 81 can determine an overall intensity that is an arithmetic average of all of the pixels of the image. Many of the metering algorithms provide an average or integrated value over only a selected area of the imager array 24, such as an upper middle region. Another approach is to evaluate multiple areas and weigh the areas differently to provide an overall value. For example, in a center weighted system, center pixels are weighted more than peripheral pixels. The camera 10 can provide manual switching between different approaches, such as center weighted and spot metering. The camera 10 can alternatively, automatically choose a metering approach based on an evaluation of scene content. For example, an image having a broad horizontal bright area at the top can be interpreted as sky and given a particular weight relative to the remainder of the image.

Under moderate lighting conditions, the imager 24 can provide light metering and color balance determination from a single preliminary image. More extreme lighting conditions can be accommodated by use of more than one member of the series of preliminary electronic images while varying exposure parameters until an acceptable electronic image has been captured. The manner in which the parameters are varied is not critical.

After the controller 81 receives the scene brightness value, the controller 81 compares scene brightness to a flash trip point. If the light level is lower than the flash trip point, then the controller 81 enables full illumination by the flash unit 36, unless the user manually turned the flash off. Appropriate algorithms and features for these approaches are well known to those of skill in the art.

A second switch S2 actuates when the shutter release 22 is further pushed to a second stroke. When the second switch S2 actuates, the film shutter 92 is tripped and the capture of the latent image exposure on the film frame begins. The film shutter 92 momentarily opens for a duration referred to herein as an "archival image exposure time interval". The imager shutter 94 is also actuated and momentarily opens one or more times during the archival image exposure time interval.

Referring now to FIGS. 1, 9–20, 28, and 35 in particular embodiments, a mechanical cropper 130 is mounted in the body 12 of the camera 10. The cropper 130 has pair of vanes 132,134. The vanes 132,134 together define a window 136 in the viewfinder light path. The position of the vanes 132,134 is controlled by a vane driver 142. The vanes 132,134 can be located anywhere along the viewfinder 58, but it is preferred that the vanes 132,134 are located against either the front cover 28 or the rear cover 30. In the following discussion of various embodiments, the vanes 132,134 are located against the inside of the front cover, unless specifically indicated otherwise.

Figure 10:
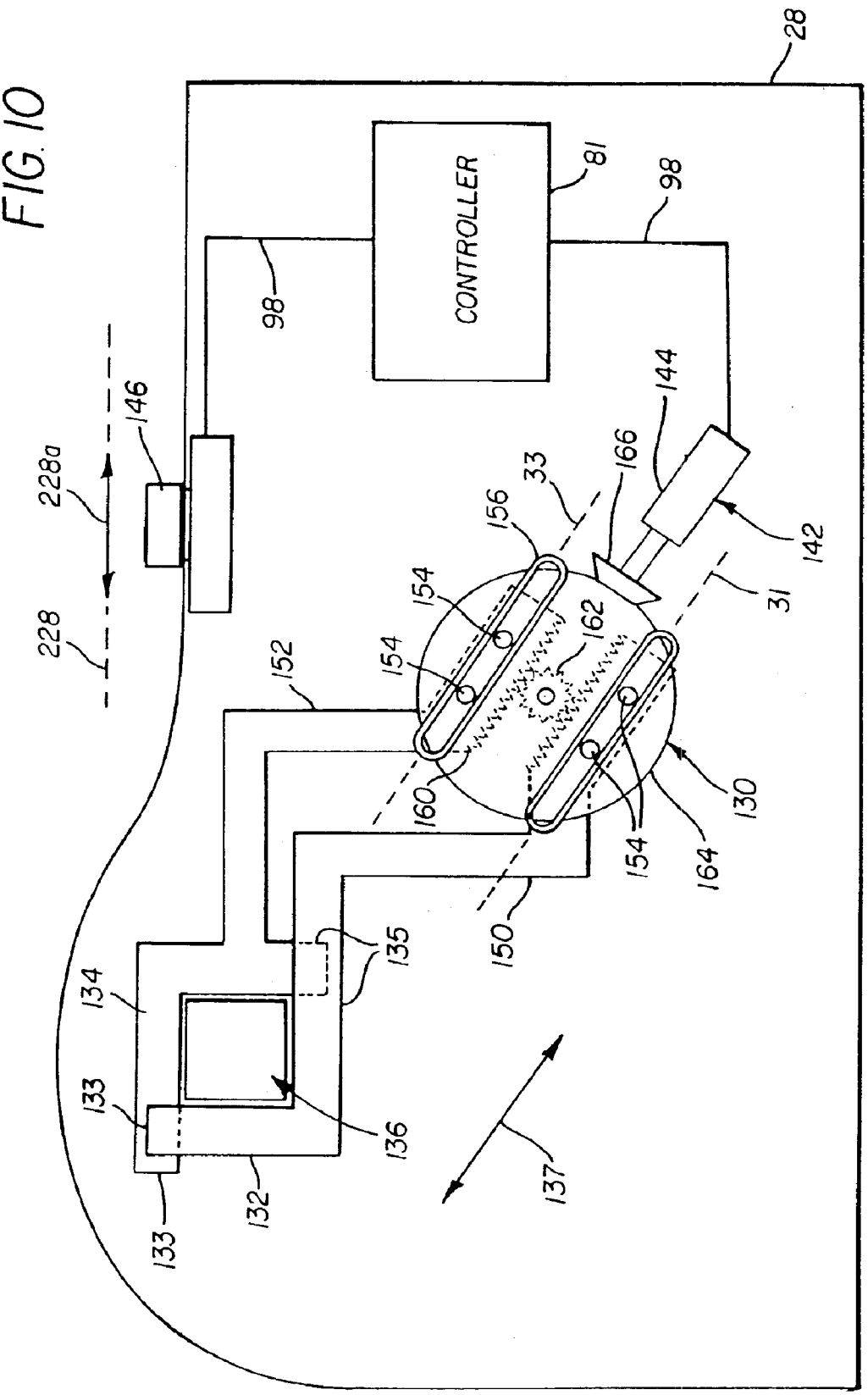
FIG. 10 is a semi-diagrammatical view of another embodiment of the camera. For clarity, only the front cover, cropper, and controller and signal lines are shown. The cropper is shown in a center intermediate vane position.

The cropper input element 146 is part of the cropper 130 and is operatively connected to the rest of the vane driver 142 directly or through the controller 81. The cropper input element 146 allows the user to move the vanes 132,134 from any one of the positions to any other. In the embodiments of FIGS. 1 and 10, the cropper input element 146 is a user manipulated electrical switch that extends through the shell of the body 12 to the outside. Manual input elements and other kinds of electrical switches and controls can also be used. For example, a voice operated control circuit (not shown) can be used.

Each vane 132,134 is movable toward and away from the viewfinder axis 79, so as to differently intercept the viewfinder light path. The two vanes 132,134 move in parallel and in opposite directions (indicated by arrow 137), along respective members of a pair of movement axes 31,33 (shown in FIG. 10). Each vane 132,134 moves back and forth oblique to the legs 133,135 and to the height and width dimensions of the window 136.

In the embodiments disclosed herein, the vanes move along movement axes 31,33 that are at an oblique angle to the legs 133,135 and to the height and width dimensions of the window 136. The vanes 132,134, are flattened and perpendicular to the viewfinder axis 79, and closely adjoin each other in an axial direction. The vanes 132,134 are L-shaped. The two legs 133,135 of each L are orthogonal. In each position of the vanes 132,134, the window 136 is rectangular in a cross-section aligned with the viewfinder entrance 139 and viewfinder exit 138. This is in accord with conventional photofinishing systems, in which hard copy output is rectangular. Vane shape could be varied to show other shapes of final images.

The vanes 132,134 are movable, as selected by the user and relative to each other and the viewfinder axis 79, between first and second positions. In the embodiments discussed herein, except as otherwise indicated, the first and second positions are end positions, beyond which further vane movement is not possible or beyond which further vane movement does not change the window in the viewfinder 58. The vanes 132,134 can be paused in the first and second positions and in any intermediate position between the first and second positions. (As an option, the vanes 132,134 can be movable toward each other until the entire viewfinder light path is occluded and all light is blocked or filtered. This inactive mode is not referred to herein as a "position" of the vanes 132,134.)

The edges 140 of the vanes 132,134 that form the window 136 surround an unblocked and unfiltered portion of the viewfinder light path. The remainder of the viewfinder light path is blocked or filtered. In the former case, the vanes 132,134 are made of opaque material. In the latter case, the vanes 132,134 are filter stock.

In the embodiment shown in FIG. 10, the vane driver 142 includes a motor 144 connected to the vanes 132,134 and a cropper input element 146 that is actuated by the user to change the position of the vanes. The motor 144 is connected to the controller 81 by a signal line. Electrical power can be supplied to the motor by a battery or other power source (not shown) through the control system or directly.

The vane driver 142 preferably moves the vanes 132,134 reciprocally in tandem and symmetrically about the viewfinder axis 79. The movement of the vanes 132,134 changes the size, and preferably, the shape of the window 136. (Window shape is generally described herein in terms of the aspect ratio of the height dimension to the width dimension.)

The vane driver 142 can be mechanical or electrical or can combine the two. In a simple case, the two vanes 132,134 can each be operated by a motor 144 actuated as required, by the controller 81. For example, the motor 144 can be a stepper motor or servomotor with an appropriate circuit. Alternatively, separate motors for each vane can be operated in tandem by the controller 81. The motor or motors can operate the vanes 132,134 indirectly through a gear train or other mechanism. Manual operation can also be provided. With a manually driven cropper 130, the cropping input element 146 is mechanically coupled to the vanes 132,134. In the embodiments of FIGS. 11–18, the cropper input element 146 extends through the body 12 to the outside. The mechanical coupling is direct between the cropping input element 146 and the vanes 132,134; that is there is no intermediate part that moves separately from the cropping input element 146 between the cropping input element 146 and the vanes 132,134. This approach has the advantage of simplicity.

The intermediate positions of the vanes extend continuously between the first and second positions. In other words, the intermediate positions are large in number and are evenly spaced between the first and second positions. The limit on the number and spacing of intermediate positions is a function of the vane driver 142. Inherent limitations on the positioning of such drive components as stepper motors and gear trains are well known to those of skill in the art and can be varied as desired, within practical and economic limitations.

Figure 11:
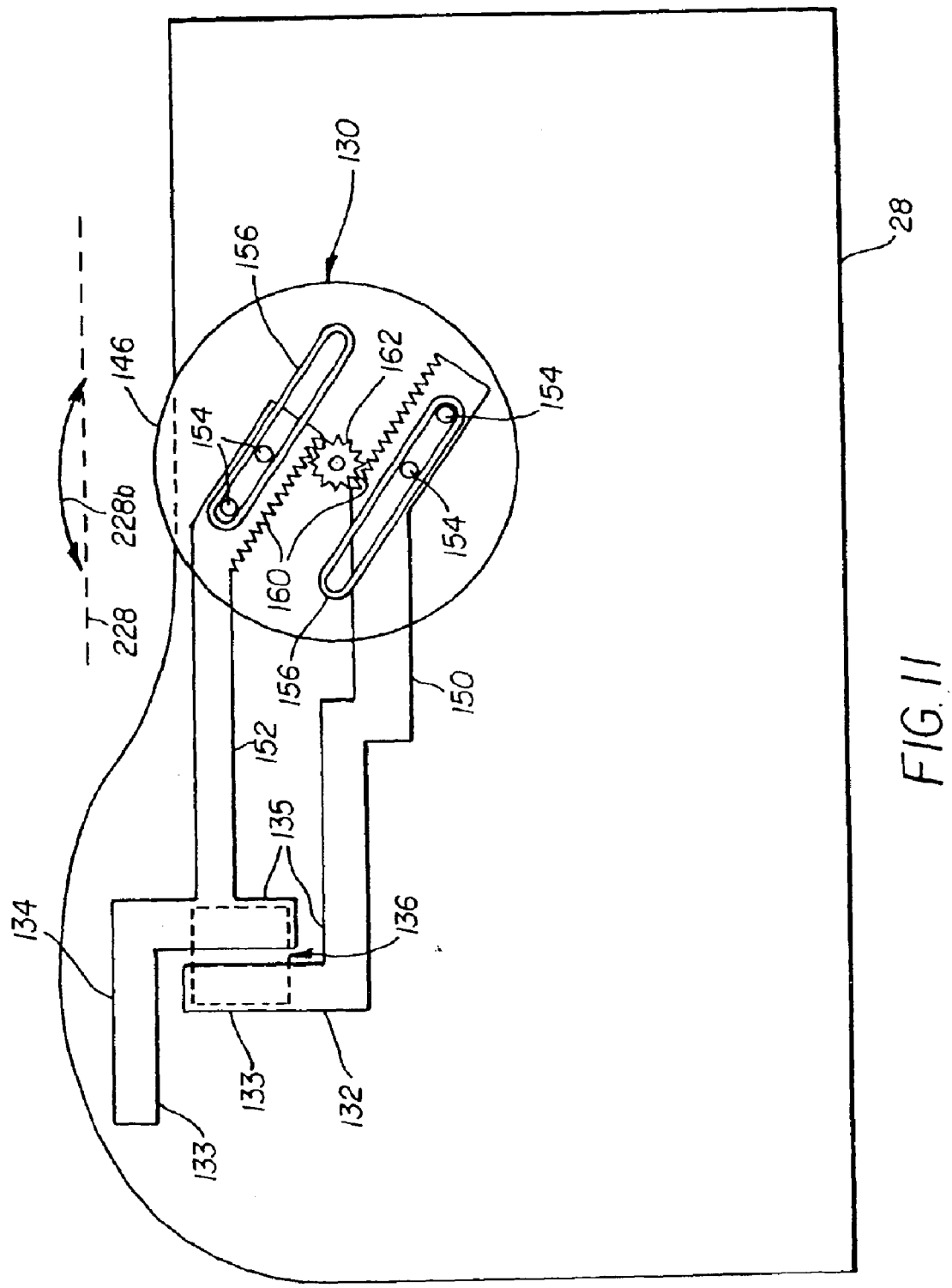
FIG. 11 is a semi-diagrammatical view of another embodiment of the camera. For clarity, only the front cover and cropper are shown. The cropper is shown in a fully-cropped to vertical vane position.
Figure 12:
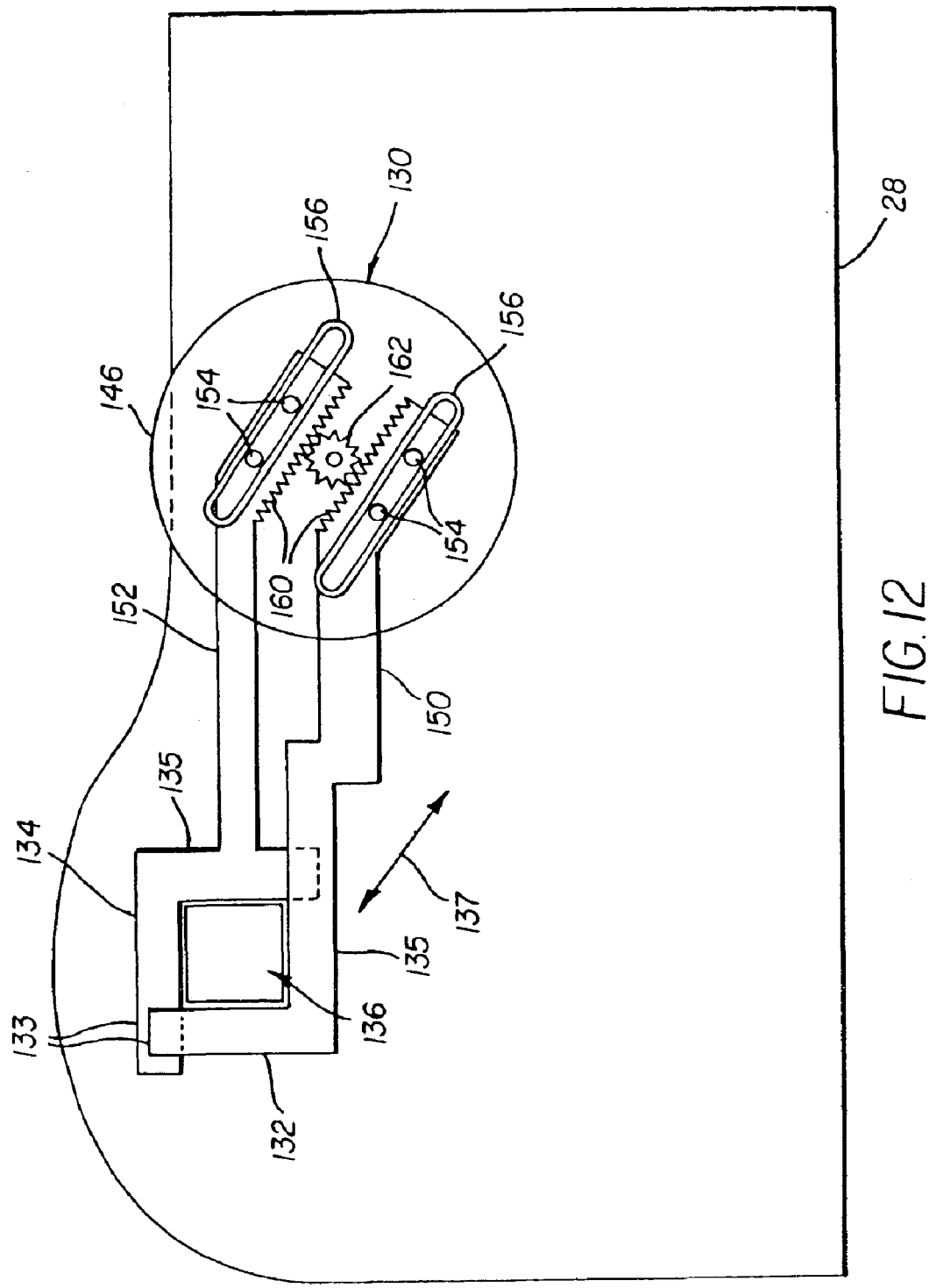
FIG. 12 is the same view as FIG. 11, but the cropper is in a center intermediate vane position.
Figure 13:
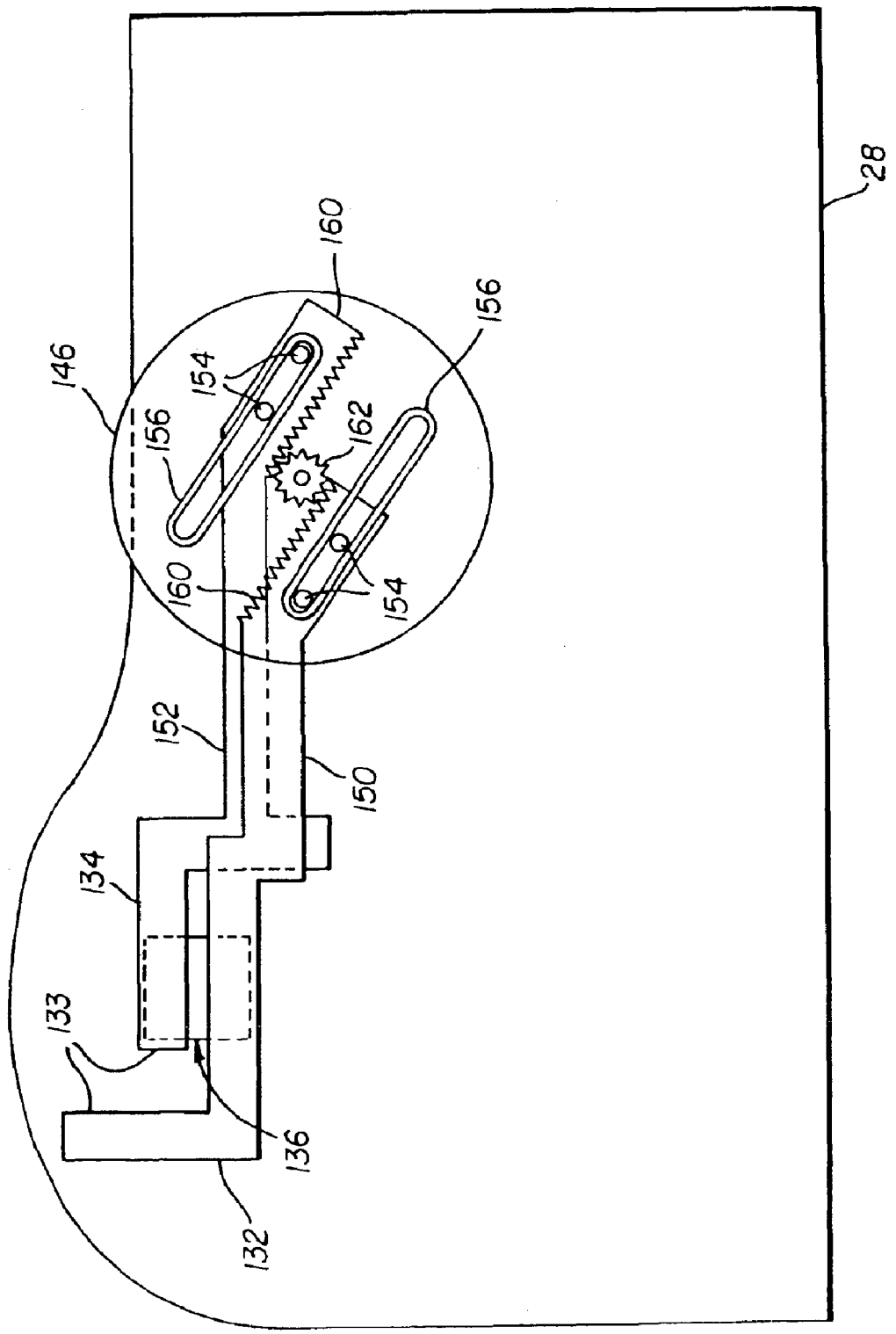
FIG. 13 is the same view as FIG. 11, but the cropper is in a fully-cropped to horizontal vane position.
Figure 14:
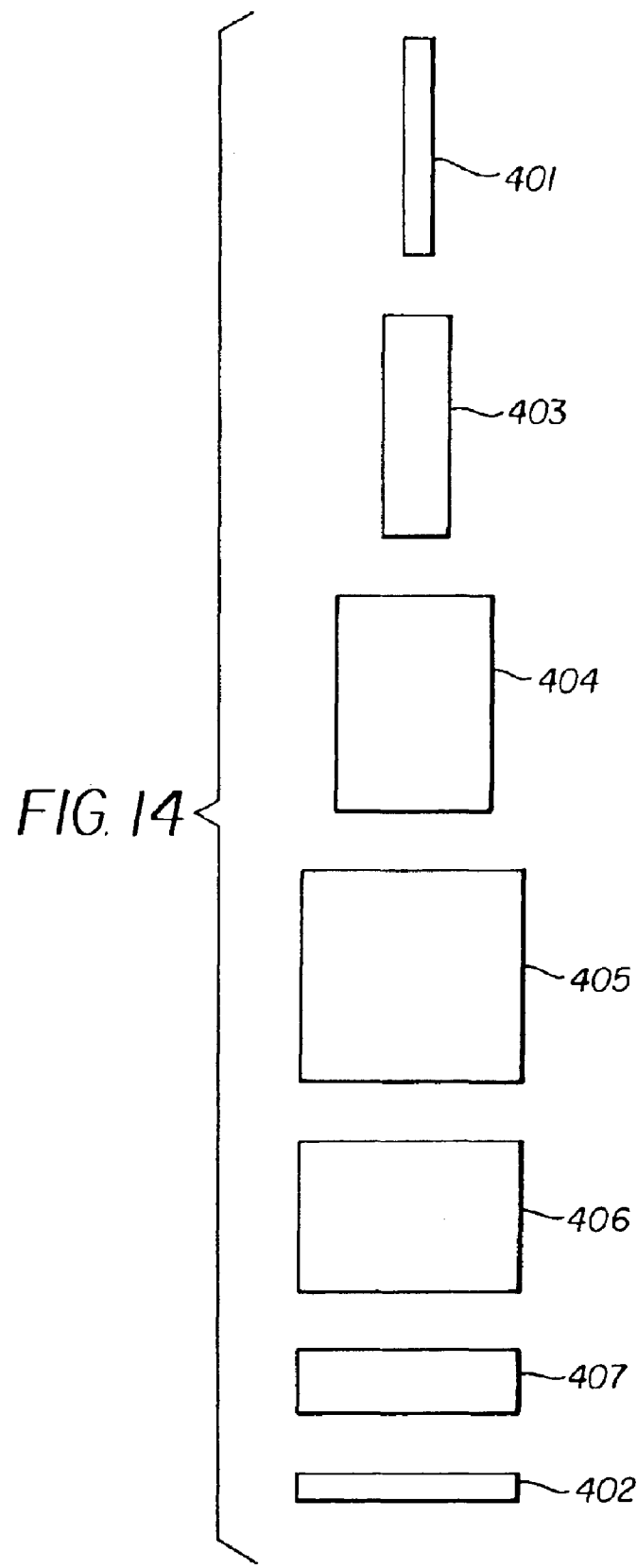
FIG. 14 is a diagram of the window defined by the cropper of the camera of FIG. 11 showing the fully-cropped vertical, fully-cropped horizontal, and five intermediate vane positions between the fully-cropped vane positions.
Figure 15:
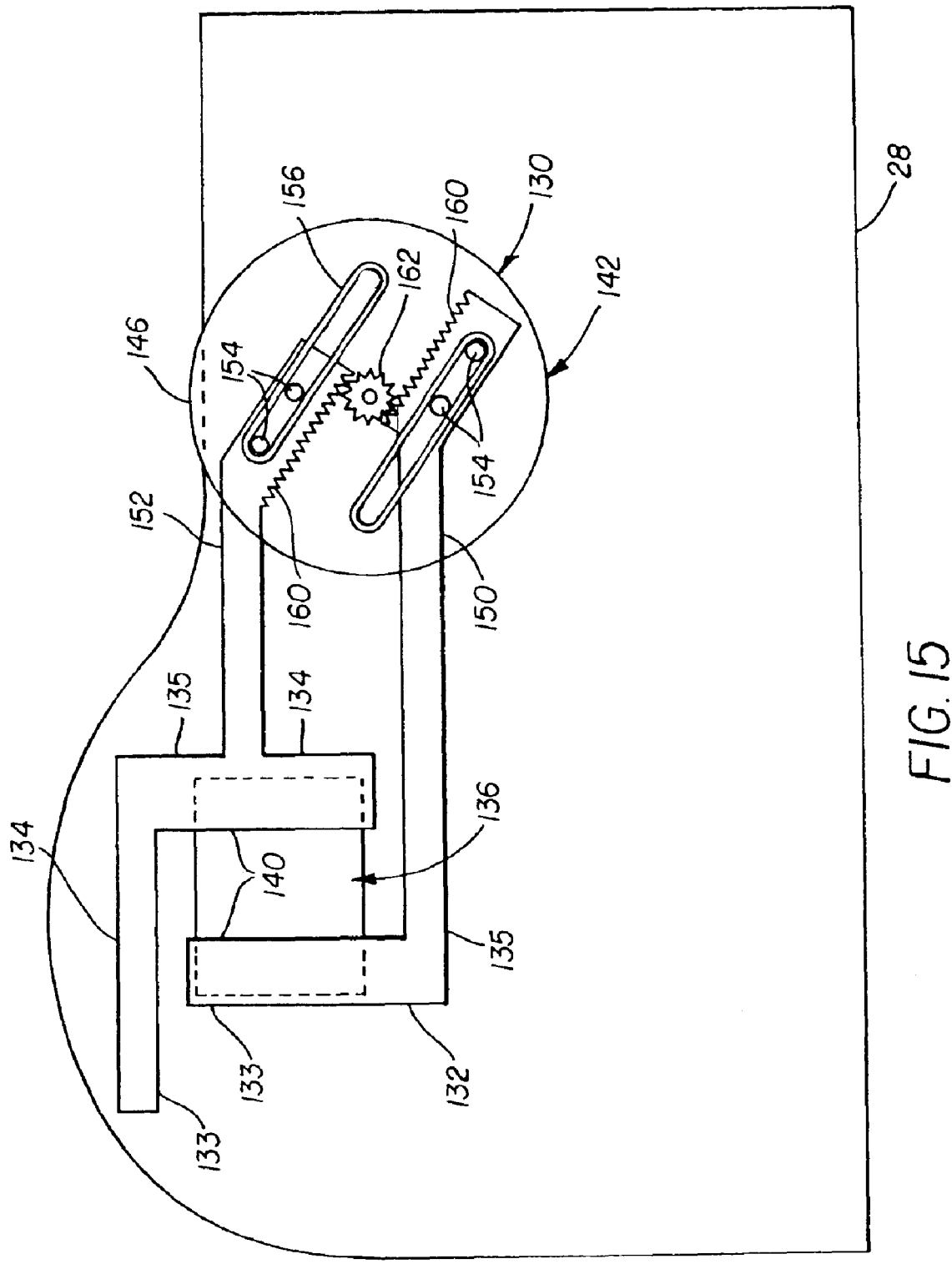
FIG. 15 is a semidiagrammatical view of a modification of the camera of FIG. 11. The cropper is shown in a fully-cropped to vertical vane position.
Figure 16:
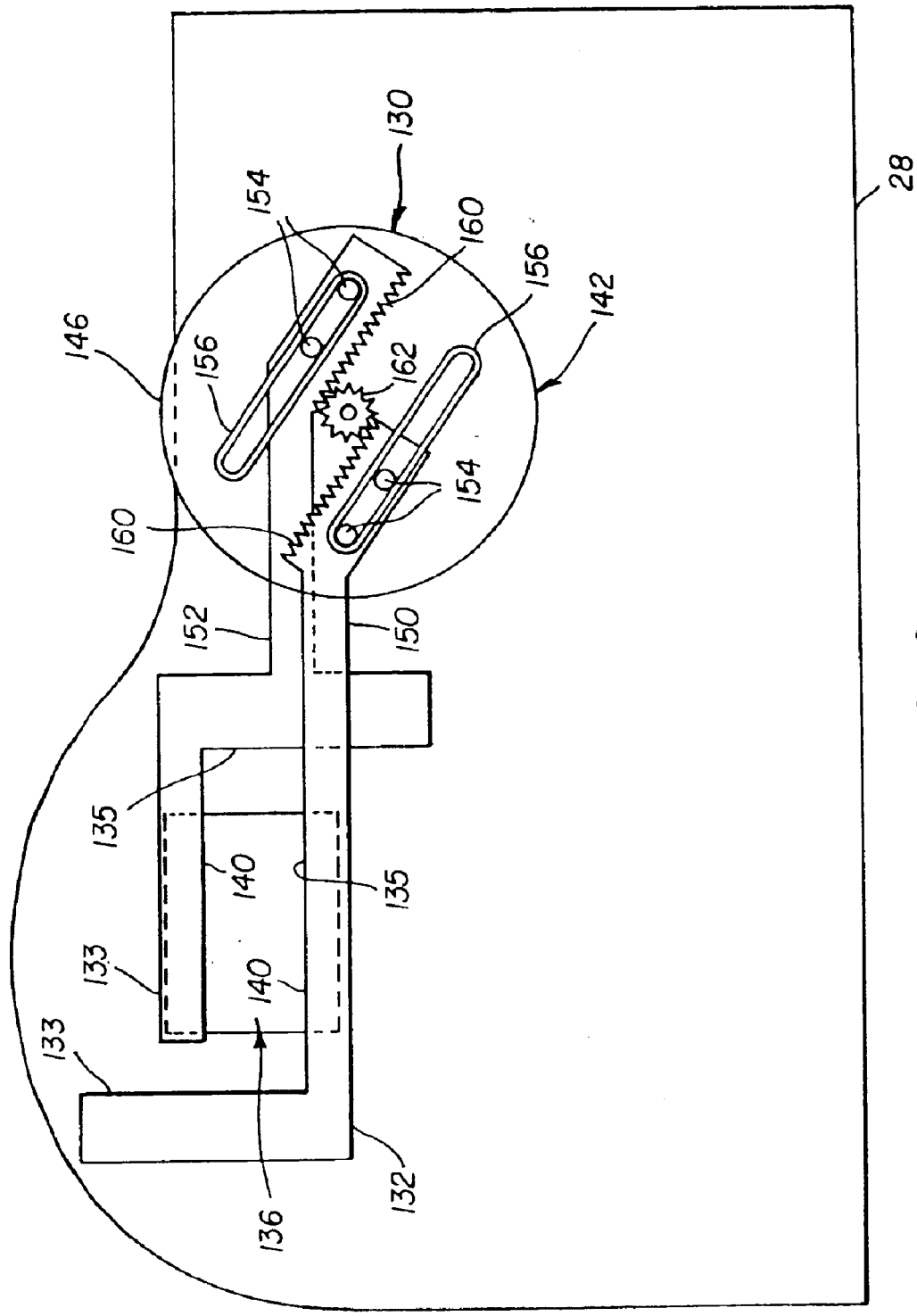
FIG. 16 is the same view as FIG. 15, but the cropper is in a fully-cropped to horizontal vane position.

Referring now to FIGS. 10–13, in particular embodiments, the window 136 is square when the vanes 132,134 are in a center intermediate position midway between the first and second positions. In this case, when the vanes 132,134 are moved, the aspect ratio (width to height) of the window 136 varies continuously and is different in every position of the vanes 132,134. Some of the aspect ratios available in the embodiment of FIGS. 11–13 are shown in FIG. 14. The aspect ratio in the first position (indicated by reference numeral 401) is a narrow vertical aspect ratio. In the second position 402, the aspect ratio is narrow and horizontal. The aspect ratio of one is the inverse of the aspect ratio of the other. (The terms first and second positions are arbitrary.) In the embodiment shown in FIGS. 11–13, the aspect ratios in the first and second positions are 1 to 5 and 5 to 1, respectively. In intermediate positions 403,404,405,406,407 the aspect ratio varies, with a square aspect ratio 405 in the center intermediate position. The embodiment shown in FIGS. 15–16 is similar, but the aspect ratios are less extreme in the first and second positions.

The vane driver 142 can have a repositioner 148 (illustrated in FIG. 35, as a dashed line box) that moves the vanes 132,134 to one or more predetermined positions under certain preassigned conditions. A simple repositioner 148 can be in the form of appropriate programming in the controller 81 that returns the vanes 132,134 to the default position whenever a predetermined condition is encountered; for example, when the camera 10 is turned off or turned on. This allows the camera 10 to start in a consistent initial state. A mechanical equivalent of this default repositioner 148 is a centering spring (not shown) that returns the cropper input element 146 to a centered position when released by the user.

The vane position or positions provided by the repositioner 148 can be any of the available positions. For example, a convenient default aspect ratio is a square in the middle between vertical and horizontal non-square aspect ratios. Another convenient default state is an aspect ratio that matches the aspect ratio of the imager 24. This aspect ratio provides the greatest number of pixels. With a hybrid film-digital camera 10, a convenient aspect ratio for dual mode image capture (digital and film) is either the native (uncropped) aspect ratio of a film frame or the aspect ratio of the imager 24.

The controller 81 is provided with inputs defining the position of the vanes 132,134. Those inputs are used to either crop the electronic image at or immediately after capture or to record metadata with the digital image, defining cropping information or, with a hybrid camera, to record similar metadata (optical, magnetic or in some other form) in association with the respective film image. An electrical input element can supply the necessary inputs directly to the controller.

Figure 31:
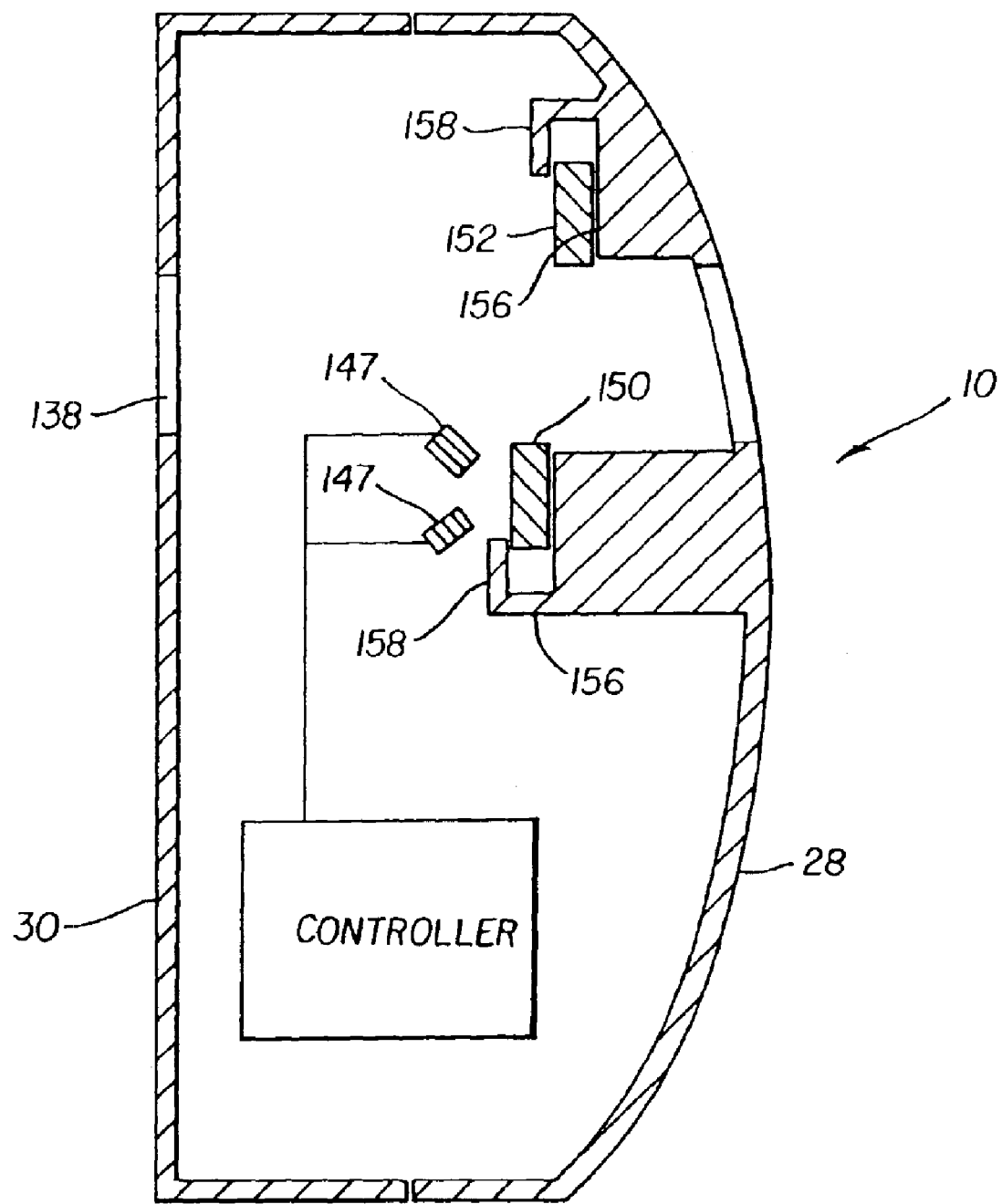
FIG. 31 is a semidiagrammatical cross-sectional view of the camera of FIG. 12 taken substantially along line A—A of FIG. 12.

A mechanical input element can supply the inputs by use of a sensor. An infrared emitter-detector pair 147 is shown in FIG. 31 positioned on either side of an extension 150 bearing optical synchronizer markings (not illustrated). Movement of the markings is detected and the digital image is cropped accordingly. Sensors used to detect movement of zoom lenses are well known to those of skill in the art and can be used here to detect movement of an extension or vane (or zoom arm discussed below) in the same manner as detecting movement of a zoom lens component.

A mechanical input element can supply the inputs directly to an electrical input element within the camera body; for example, the shaft of the pinion can be coupled directly or indirectly to a variable resistor.

The controller 81 can be programmed to retain the vanes 132,134 in a current position until an action is taken or a predetermined amount of time has elapsed or the camera state has changed due to a timed power down, or the like. This exploits a principle of "locality of aspect ratio" that assumes that the photographer's currently selected aspect ratio is likely to either match or be close to the aspect ratio that will be desired for the next photograph. The opposite approach can also be provided. In that case, the camera 10 resets to the default vane position after every exposure.

Figure 20:
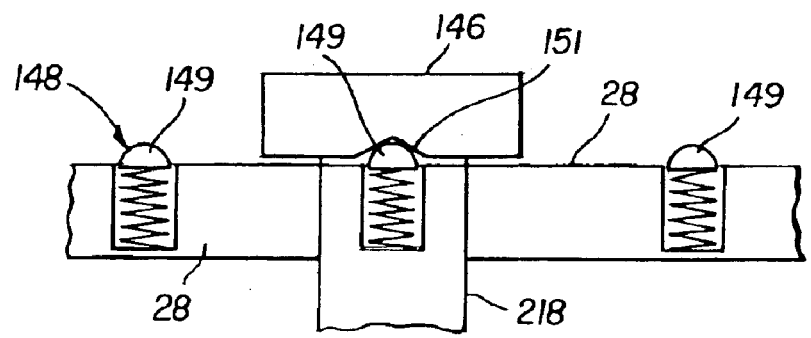
FIG. 20 is a partial close-up semidiagrammatical view of a modification of the cropper input element and front cover of the camera of FIG. 19.
Figure 25B:
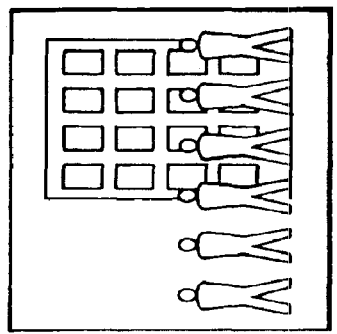

FIG. 20 illustrates a repositioner 148 having three preset positions. The cropper input element 146 is a slider that protrudes through a slot in a cover 28 of the camera 10. The cover 28 of the camera 10 has three spaced spring-loaded detents 149 and an adjoining surface of the cropper input element 146 has a cup-shaped cut-out 151 that can receive the detents 149. In this case, the vanes 132,134 can be easily moved, on demand, from an arbitrary position to one of the preset positions or one of the non-preset positions. The repositioner 148 can be conveniently provided as a part of control unit programming. In a hybrid camera 10, one use of preset modes is to allow for easy vane movement to positions corresponding to film cropping formats, such as C, H, and P formats for Advanced Photo System™ film.

Detents can also be provided by controller programming that creates a "dead zone" on the cropper input element 146 in the vicinity of each preset aspect ratio so that all control settings in the vicinity of the preset aspect ratio will produce to the exact ratio of the preset aspect ratio. Aspect ratio changes remain continuous outside the dead zones. An indication can be provided on the information display or in some other manner to show the user when a particular preset aspect ratio has been selected by the cropping control knob. The control unit can alternatively limit aspect ratio changes to the presets in particular capture modes, such as film capture without archival digital capture.

In addition to altering the vane position, the repositioner can change other camera features so as to define specific photography modes. For example, the repositioner can have a portrait mode that moves the vanes 132,134 to a preselected vertical aspect ratio and simultaneously zooms a zoom taking lens in so as to fill the frame. This would encourage a high-quality portrait while allowing the photographer to stand a comfortable distance away from the subject. Another example is a panoramic mode that moves the vanes 132,134 to a long horizontal aspect ratio while also zooming a taking lens to, a wide view angle. In both of these examples, a zoom viewfinder lens coupled to the taking lens or a viewfinder zoom mask 530 (discussed below) is desirable to aid the user in composing pictures. These features can be implemented in software of the controller 81.

Some of the aspect ratios provided by the cropper 130 can be more extreme than standard photographic formats. Such high-aspect ratio photographs are useful for special-purpose images such as borders of composite image, use along the bottom or side of letterhead, and the like. The cropper 130 has the advantage that the final image aspect ratio can be seen clearly at capture time, allowing the photographer to adjust view direction and camera 10 angle as necessary to capture the desired image content. As earlier mentioned, in some cases such as extreme aspect ratios, it may be desirable to use a transparent material for the vanes 132,134, so that the photographer can more easily ascertain included and excluded scene features.

Referring now to FIGS. 10–20, in particular embodiments an extension 150,152 is joined in fixed (immobile) relation to or continuous with each of the vanes 132,134, respectively. (The term "vane-extension" is used herein to refer to the combination of a vane 150,152 and the respective extension 132,134.) Each extension 150,152 has one or more guide portions 154. The cover has one or more guide sections. The guide sections 156 allow linear movement of the guide portions 154 along the guide sections, but permit little or no side-to-side movement within the guide sections 156. In the illustrated embodiments, the guide portions 154 are shaped like pins that extend outward from the respective extension 150,152 into the respective guide section. Two parallel guide sections 156 in the cover are each shaped like a narrow rectangle or oval and can be in the form of a groove recessed in the respective cover or a inwardly extending rim that stands proud of the rest of the cover. Two pin-shaped guide portions 154 slide along a respective guide section 156. The guide portions 154 and guide sections 156 can have other shapes. For example, the guide sections 156 can be shaped like pins and the guide portions 154 can provide tracks in the form of slots. Likewise, a linear bearing could be used in place of a guide portion 154 and respective guide section 156.

The extensions 150,152 and vanes 132,134 are blocked by backing 158 from moving away from the front cover. In the embodiments shown in the figures, the backing 158 is in the form of separate flanges that extend along respective extensions 150,152 and vanes 132,134. Thus, the extensions 150,152 and vanes 132,134 are trapped between the backing 158 and the cover. The configuration of the backing can be changed. For example, the backing can be a continuous plate attached to one or both covers or can be part of the frame 32.

The extensions 150 are mechanically coupled to move the vanes 132,134 in tandem. In the embodiment of FIGS. 10–18, each extension 150 has a linear rack 160 and the cropper 130 has a pinion 162 that is meshed with both racks 160. The axle of the pinion is held by a cup 163 (shown in FIG. 17) molded in the cover and a matching cup (not shown) in the backing 158. The cups prevent translation of the pinion relative to the cover. Both racks 160 are meshed with the pinion 162. The pinion 162 couples the motion of the two vanes 132,134, synchronizing them in opposite directions.

In FIG. 10, the pinion 162 is rotated, clockwise and counterclockwise, by a primary gear 164 to move the vanes 132,134 between positions. The primary gear 164 is joined in fixed (immobile) relation to the pinion 162. The primary gear 164 is meshed with a secondary gear 166 that is joined in fixed relation to a motor 144 or the shaft of a cropper input element in the form of a rotatable knob (not shown). In FIG. 11, the cropper input element 146 is a finger wheel that replaces the primary gear 164 that drives the pinion 162.

Figure 32:
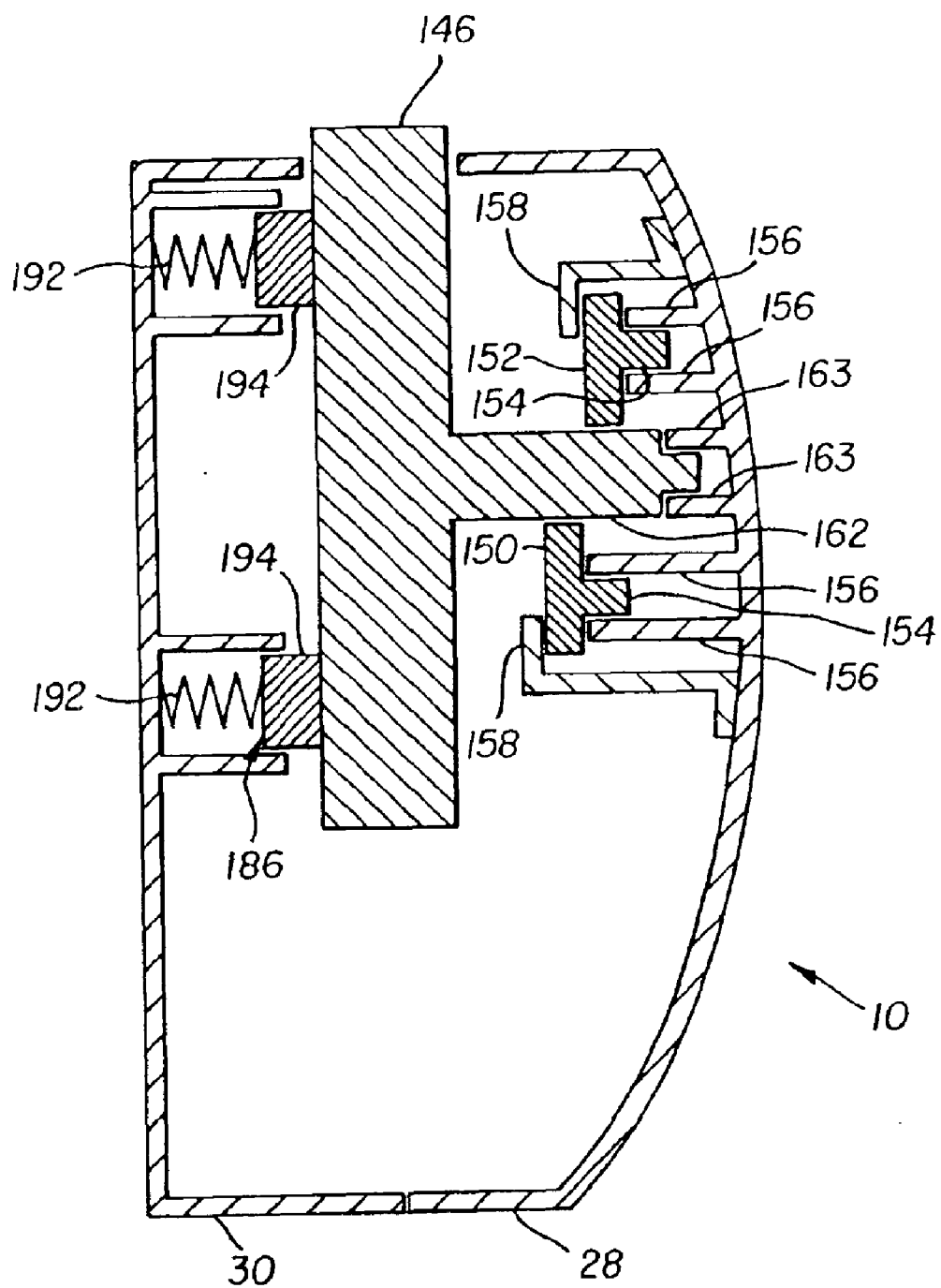
FIG. 32 is a semidiagrammatical cross-sectional view of the camera of FIG. 12 taken substantially along line B—B of FIG. 12.
Figure 33:
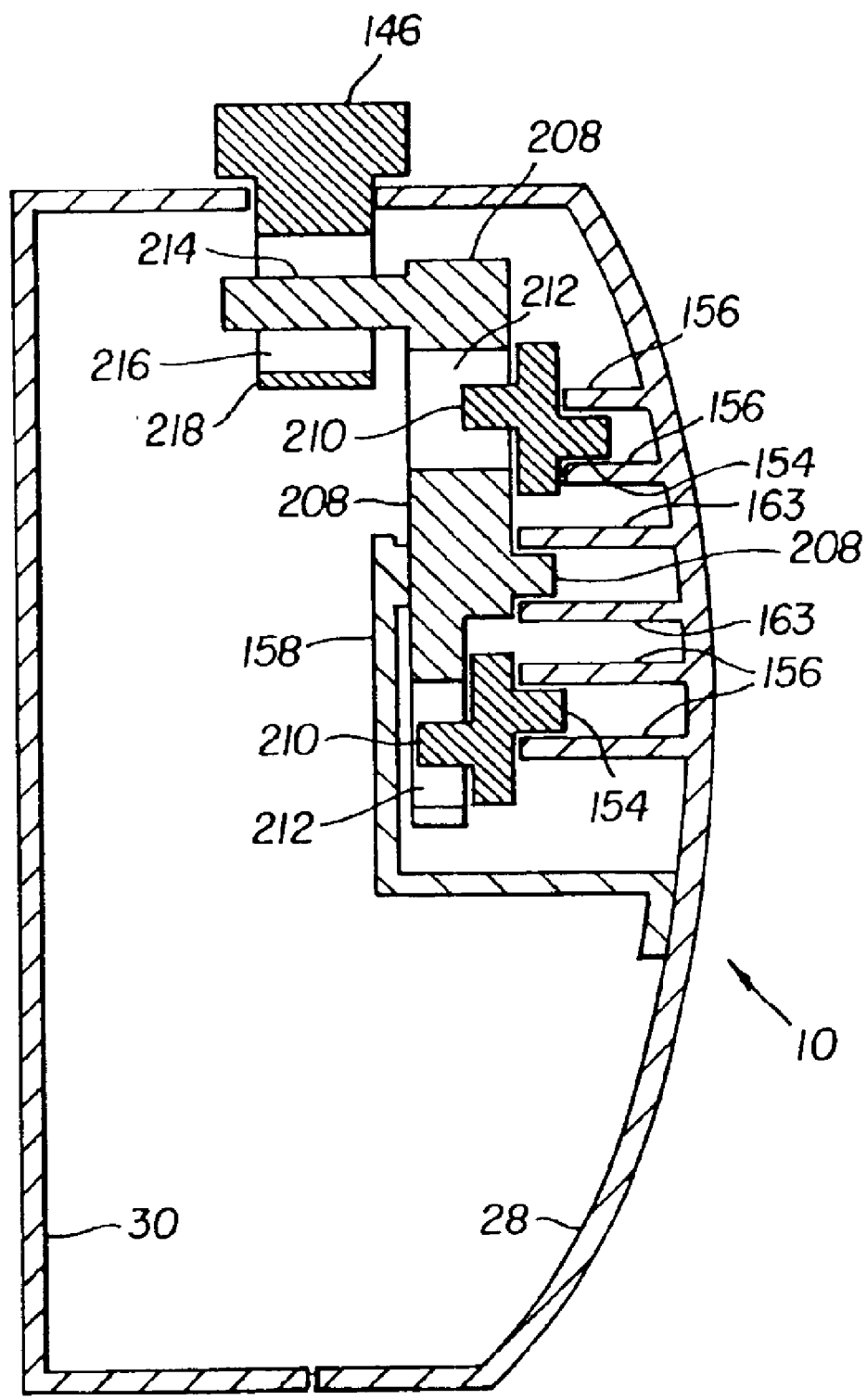
FIG. 33 is a semidiagrammatical cross-sectional view of the camera of FIG. 18 taken substantially along line C—C of FIG. 18, except that the lens cover is shown in the open position rather than in the closed position.
Figure 34:
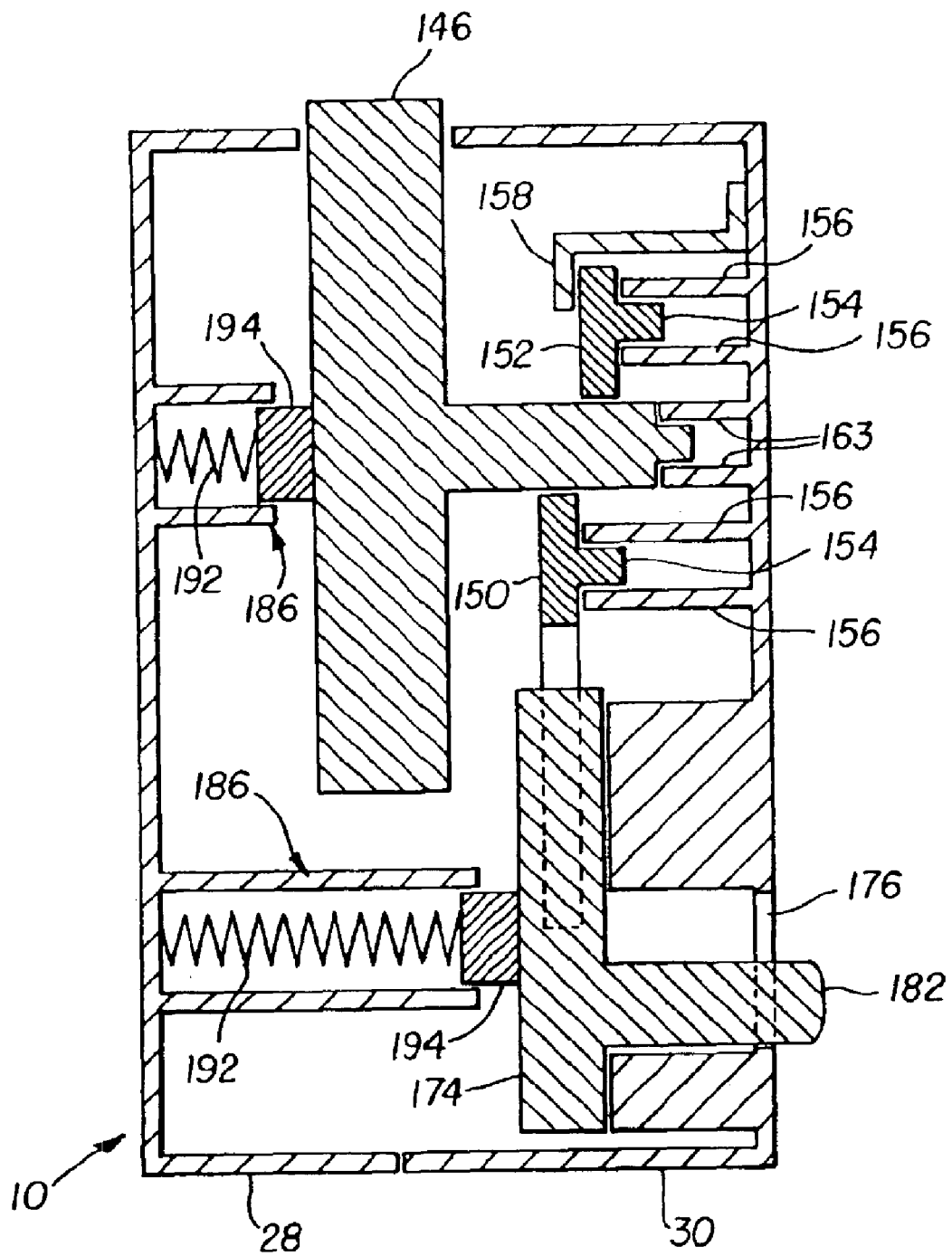
FIG. 34 is a semidiagrammatical cross-sectional view of the camera of FIG. 19 taken substantially along line D—D of FIG. 19.

The backing 158, shown in FIGS. 31–33, holds guide portions 154 of the two extensions 150 against the guide sections 156 and the pinion 162 in the cup (not shown). The guide portions 154 are constrained by the guide sections 156 and backing 158, limiting movement of each of the vanes 132,134 (within manufacturing tolerances) to sliding in a direction parallel to the respective guide sections. The vanes 132,134 lie in two parallel overlapping planes. This spacing can be provided by an offset in one of the guide sections 156, as shown in FIG. 31, or a step in one of the extensions 150 (not shown), or in some other manner.

The pinion 162 can be driven through a gear train to achieve desired ratios between cropper input element motion and vane motion. For example, a gear train can be used in place of pinion 162, if desired, to reduce the size or relocate the finger wheel or to adjust the mechanical advantage, or to provide a combination of these effects. The pinion 162 can have a larger diameter. The primary gear 164 or finger wheel can be reduced to a sector to reduce bulk.

The position of mechanically driven vanes 132,134 during use, can be held by internal resistance of the various parts, if the user removes a finger or otherwise momentarily stops vane movement. Alternatively, a slip clutch 186 can bear against a vane or extension or other part to prevent unintended movement of the vanes. A wide variety of slip clutches are well known to those of skill in the art. For example, in the embodiment shown in FIG. 32, the slip clutch 186 is a pair of compression springs 192 and a pair of pressure elements 194 pressed by the compression springs 192 against a cropper input element 146 of the type shown in FIG. 11. The compression springs 192 and pressure elements 194 are selected to allow required movement of the cropper input element 146.

The relative position of the vanes 132,134 and extensions 150 can be varied to accommodate differently located viewfinders and to adapt to particular camera body shapes and available space. The guide sections 156 can be located at different places relative to the viewfinder and can be slanted toward the upper right instead of the upper left. This allows different locating of the mechanism in the camera body 12. The extensions can be reshaped as necessary to meet spatial limitations of a particular embodiment. The vanes 132,134 and respective extensions 150,152, which are one-piece plastic castings in the illustrated embodiments, can also be made as two separate parts that are mechanically coupled together.

In the embodiment shown in FIG. 10, the gears 164,166 are bevel gears. (In this drawing, as in many other drawings herein, gear teeth may not be shown.) These and other mechanical features can be changed. For example, mounting features can be provided in other parts than one of the covers 28,30, such as the chassis 32 or an intermediate plate (not shown). The gears and gear trains disclosed herein can be replaced by like mechanical components, such as friction wheels and friction wheel trains. Belts, toothed or smooth, and sprockets are other types of mechanical features that can also be used in a modified mechanism.

Figure 17:
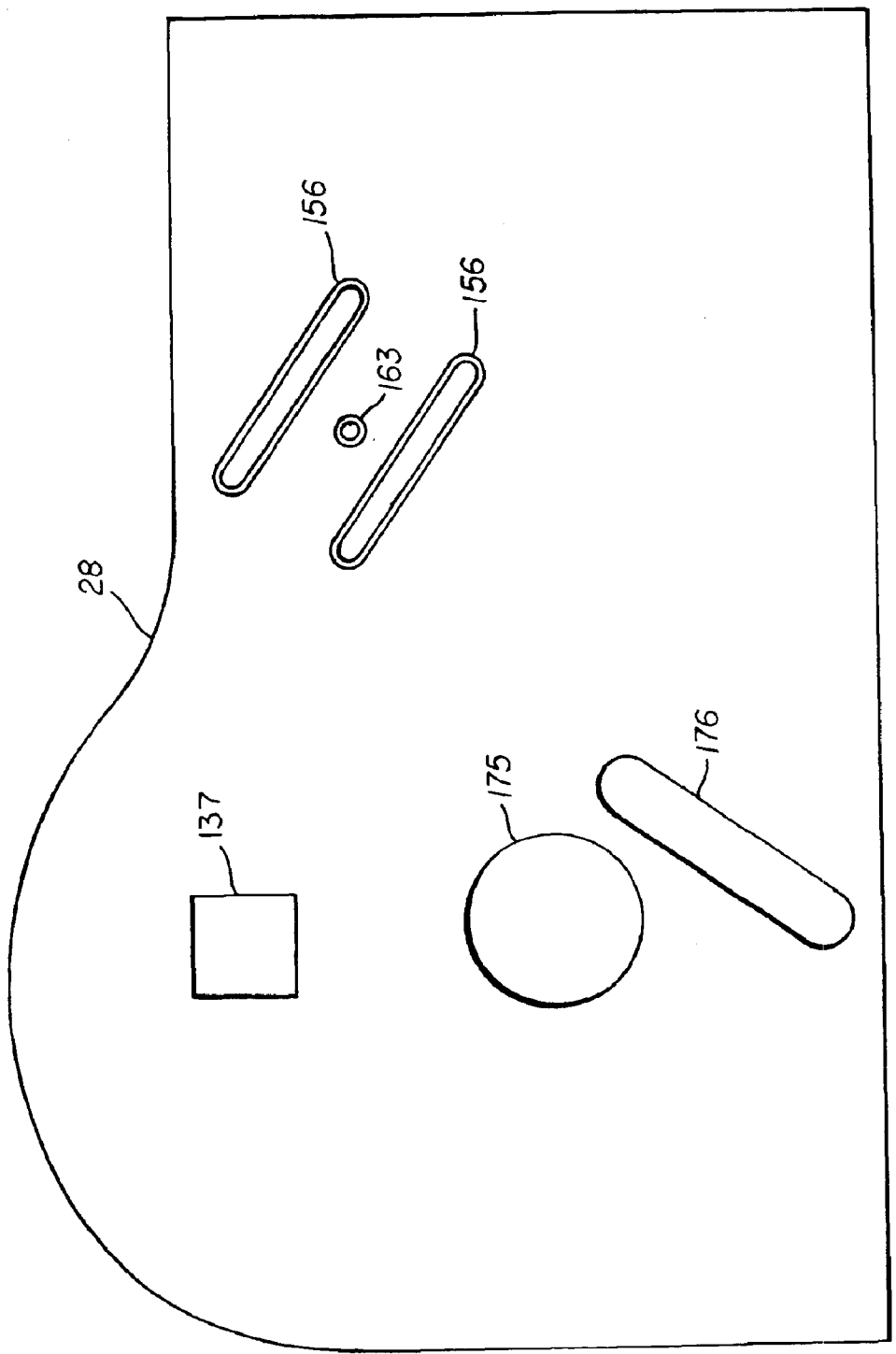
FIG. 17 is a semidiagrammatical view of the front cover of a modification of the camera of FIG. 11.
Figure 18:
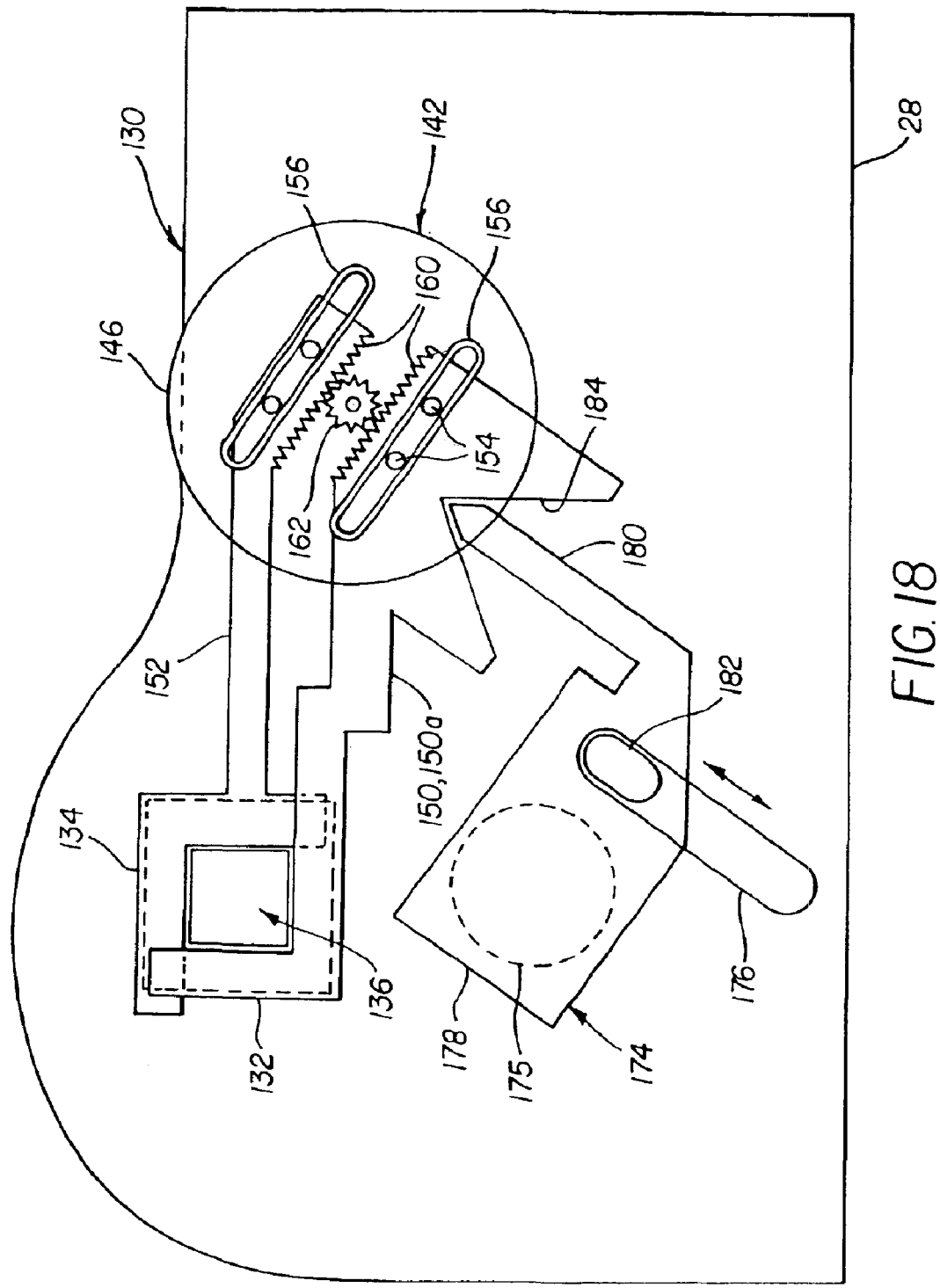
FIG. 18 is a semidiagrammatical view of the camera of FIG. 17. For clarity, only the front cover, cropper, and lens cover are shown. The cropper is shown in a center intermediate vane position and the lens cover in a closed position.

In a particular embodiment, shown in FIGS. 17–18 and 33, the camera 10 has a lens cover 174 that is movable between an open position and a closed position. (FIG. 18 illustrates the closed position, in which the lens cover 174 covers an opening 175 in the front cover 28 for the taking lens.) The lens cover 174 has a handle 182 that rides in a through-slot 176 in the front cover 28 of the body 12. The lens cover 174 is held in place by a slip clutch 186 and/or backing (not shown), in the same manner as the other components earlier discussed.

The lens cover 174 and a modified extension 150a act as a default repositioner. The lens cover 174 has a main portion 178 and a cam follower 180 joined to the main portion 178. The lens cover 174 is spaced from the capture light path in the open position (not shown). The main portion 178 occludes the capture light path when the lens cover 174 is in the closed position (shown in FIG. 18). A handle 182 of the lens cover 174 protrudes through the front cover 28 and is manually movable to open or close the lens cover 174.

The extension 150a of the lower vane 132 has a cam surface 184 that is matched to the shape of the cam follower 180. In the embodiment shown in FIGS. 17–18, the cam follower 180 chocks the lower vane 132, braking cropper 130 movement, when the lens cover 174 is in the closed position. When the lens cover 174 is moved from the open position to the closed position, the cam follower 180 engages the cam surface 184 and drives the vanes 132,134 to the center intermediate position. When the lens cover 174 is in the open position, the taking lens 76 is uncovered and the vanes 132,134 are movable through their entire range of travel. Movement of the lens cover 174 to the closed position centers a mechanically linked cropper input element 146. This can be problematic if the knob of the cropper input element 146 is gripped, at that time, by the user. A slip clutch can be provided in the knob to resolve this problem. Reset of vane position to a default after every exposure can be provided by suitable programming of the controller 81.

Figure 28:
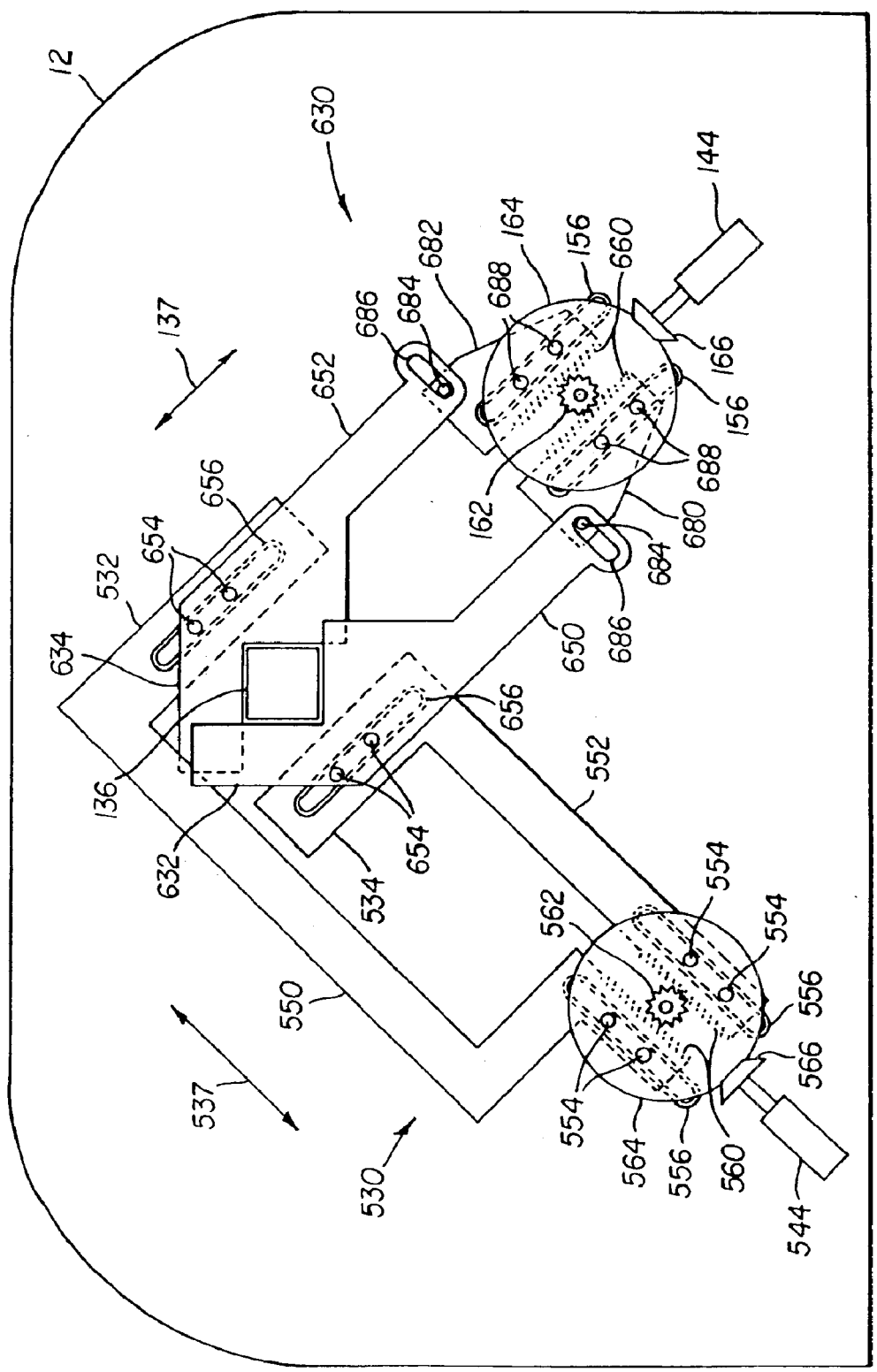
FIG. 28 is a partial semidiagrammatical view of another embodiment of the camera. For clarity only the front cover, cropper and zoom mechanism are shown. The cropper is in a center intermediate position. The zoom mechanism is in a zoomed out position.

Referring now to FIG. 28, in particular embodiments of the invention, a zoom masking mechanism 530 is mounted in the body 12 of the camera 10, in addition to the cropper 630. The two mechanisms together control the viewfinder window 136. The zoom masking mechanism 530 reduces the size of the window 136 while maintaining a constant aspect ratio. The cropper 630 modifies the shape of the window 136 by changing the aspect ratio.

The zoom mask 530 has pair of opposed L-shaped zoom arms 532, 534. The zoom mask arms have zoom mask extensions 550, 552. These extensions have zoom guide portions 554 that engage zoom guide sections 556. The zoom guide sections 556 are attached to the camera body 12. The directions of movement of the guide portions 554 of the zoom mask extensions 550,552 are indicated by arrow 537. The extensions each have a zoom rack 560 that engages a zoom pinion 562, which couples the zoom mask arms 532,534 to move in opposite directions. The zoom pinion 562 is attached to a zoom primary gear 564, which is driven by a zoom secondary gear 566, which is in turn driven by a zoom motor 544.

The cropper 630 has pair of opposed L-shaped cropper vanes 632, 634. The cropper vanes have cropper extensions 650, 652. The cropper also has a pair of cropper links 680, 682. The cropper links have guide portions 684, which engage guide sections 686 in the cropper extensions 650, 652. The links have additional guide portions 688 that engage cropper guide sections 156, attached to the camera body 12. The directions of movement of the guide portions 688 of the links 680, 682 are indicated by arrow 137. The cropper links each have a cropper rack 660 that engages the cropper pinion 162, which couples the links 680, 682 to move in opposite directions. The cropper pinion 162 is attached to a cropper primary gear 164, which is driven by a cropper secondary gear 166, which is in turn driven by a cropper motor 144.

The cropper vanes 632, 634 have guide portions 654 which engage guide sections 656 attached to the zoom arms 532, 534. The guide sections 656 and guide portions 654 constrain the cropper vanes 632, 634 to move parallel to arrow 137, when the zoom arms 532, 534 are held in a fixed position. The guide portions 684 and guide sections 686 constrain the cropper vanes 632, 634 to move in tandem with the cropper links 680, 682. Because of the linkage of the various racks, pinions, and guides, the cropper vanes 632, 634 move in opposite directions parallel to arrow 537 when the zoom motor 544 turns, and these same vanes move in opposite directions parallel to arrow 137 when the cropper motor 144 turns.

Figure 29:
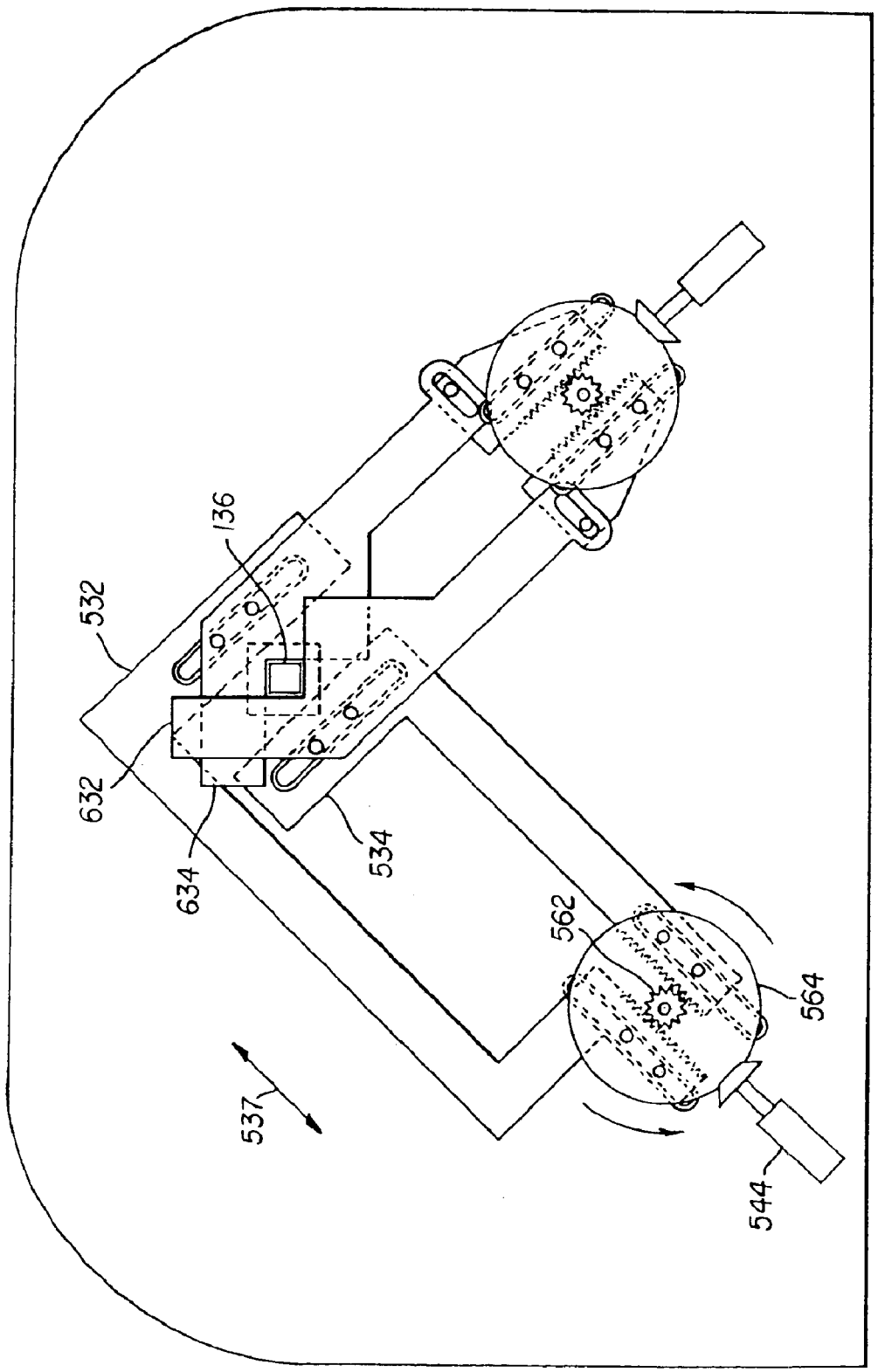
FIG. 29 is the same view as FIG. 28, but the cropper is in a center intermediate position and the zoom mechanism is in a zoomed in position.
Figure 30:
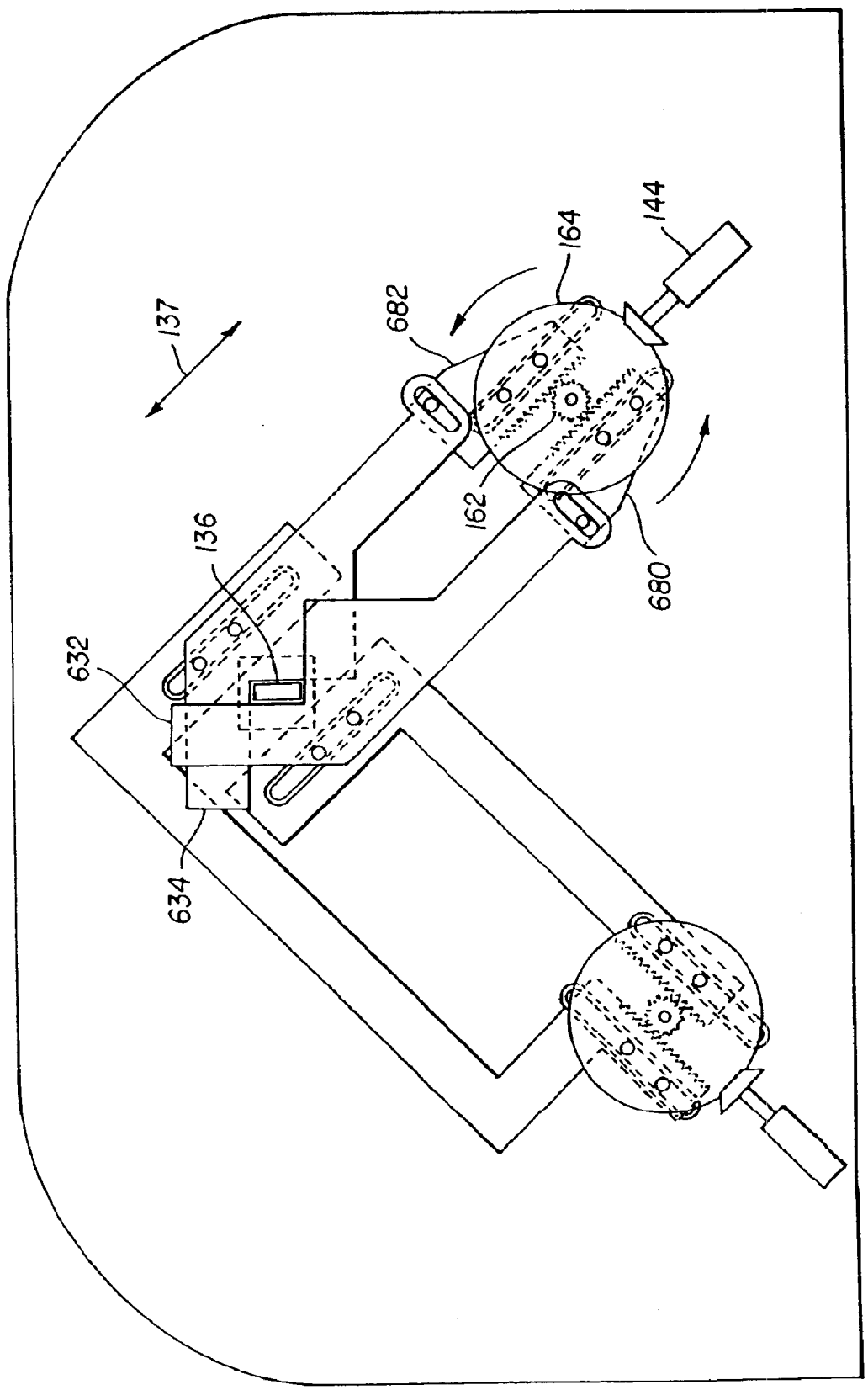
FIG. 30 is the same view as FIG. 28, but the cropper is in a low aspect ratio position and the zoom mechanism is in a zoomed in position.

FIGS. 28–30 show how this mechanism can adjust both zoom and aspect ratio as seen through the viewfinder. FIG. 28 shows the mechanism in the fully zoomed out position, with a square aspect ratio.

FIG. 29 shows the mechanism after the zoom motor 544 has turned, causing the zoom primary gear 564 and attached zoom pinion 562 to rotate counter-clockwise. This causes the zoom arms 532, 534 to move in opposite directions, parallel to arrow 537. The cropper vanes 632, 634 follow this motion, which causes the viewfinder window 136 to become smaller while maintaining its square aspect ratio.

FIG. 30 shows the mechanism in the zoom configuration of FIG. 29, but after the cropper motor 144 has turned. When the cropper motor 144 turns, the cropper primary gear 164 and cropper pinion 162 to turn counter-clockwise. This causes the links 680, 682 to move in opposite directions, parallel to arrow 137. The cropper vanes 632, 634 follow the links, resulting in a change in the aspect ratio of the viewfinder window 136.

Figure 19:
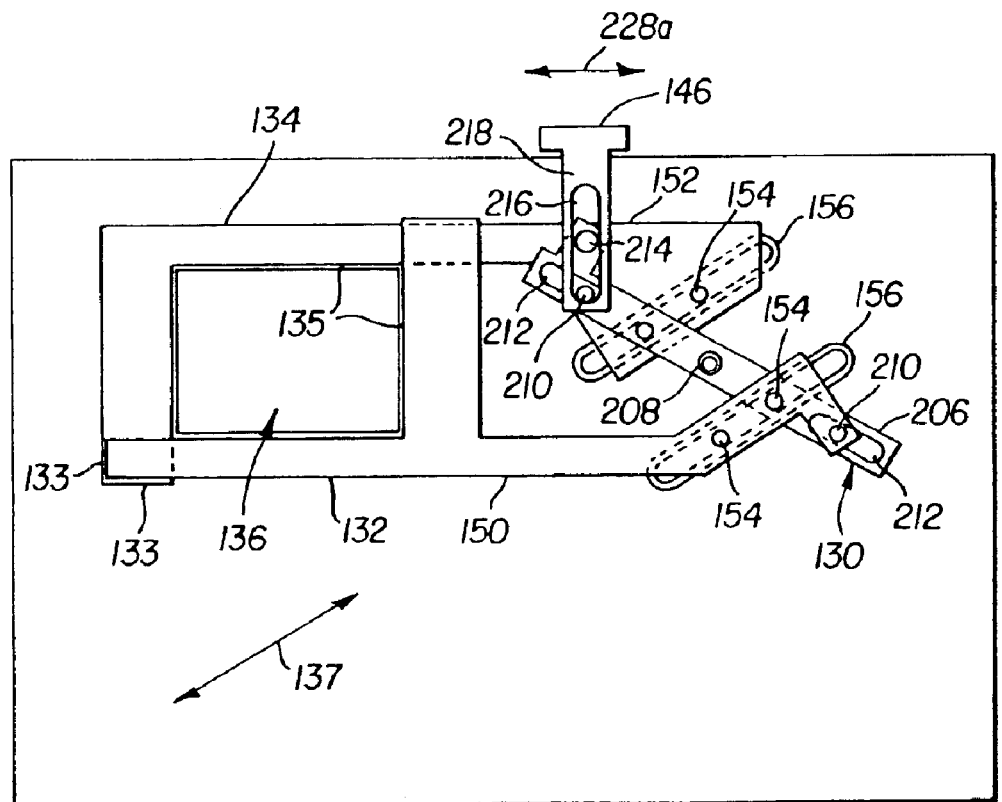
FIG. 19 is a semidiagrammatical view of another embodiment of the camera. For clarity, only the front cover and cropper are shown.

Referring now to FIG. 19, in particular embodiments, the cropper 130 has a lever-based mechanism controlled by a sliding cropper input element 146. This mechanism is similar to those earlier discussed, except that gearing is replaced by levers. A main lever 206 is pinned at a centerpoint to the camera cover 28 or 30. The main lever 206 is pivotable about an axle 208 that extends through the centerpoint. The axle 208 can be held in position by a cup in the same manner as the pinion 162, earlier discussed. The extensions 150 again have guide portions 154 that ride in guide sections 156 formed in the cover and are held in place in the same manner as in earlier embodiments. The guide portions 154 and guide sections 156 constrain the movement of the vanes 132,134 to sliding in directions indicated by arrow 137.

The extensions 150,152 each have a secondary guide portion 210 that interacts with a secondary guide 212 provided at each end of the main lever 206. The secondary guide portion 210 and secondary guide 212 can be provided in the same manner as the guide portions 154 and guide sections 156 earlier discussed. In the illustrated embodiment, the secondary guide portions 210 are pins and the secondary guides 212 are slots that receive the pins. The main lever 206 has a main lever guide 214 that interacts with a traversing guide 216 on the sliding cropper input element 146. In the illustrated embodiment, the main lever guide 214 is a pin and the traversing guide 216 is a slot that receives the pin. The sliding cropper input element 146 is a knob having an elongated neck 218 that extends into the body 12. The neck 218 includes the traversing guide 216. The main lever 206 is moved by the knob 146. The main lever 206, in turn, drives the vane-extensions with the motion coupled, and synchronized in opposite directions. FIG. 19 shows the cropper 130 in a center intermediate position.

A variety of different kinds of electrical switch types can be used as the cropper input element 146. The cropper input element 146 can have two states. In this case, the controller 81 retains the vane position in one state and cycles the position of the vanes step by step in one direction or back and forth, in the other state. This approach is not preferred, since it is relatively slow and cumbersome. Another alternative is three states. In this case, there are two active states, for stepping the vanes up and down, respectively. Both of these approaches can be modified to change positions faster if the input element is retained in one of the active states or is rapidly actuated. This allows the user to quickly change to a desired range of positions and then more slowly select a position within that range. The position of the input element can also map to a particular vane position. This is convenient for mechanical input elements and can also be provided with electrical input elements.

Referring to FIG. 10, in particular embodiments, the photographer changes vane position by moving a knob-shaped cropper input element 146 to change the position of a switch (not separately illustrated). The user rotates or slides the cropper input element in either of two opposed directions to alter the vane positions. Each position of the cropper input element 146 can correspond to a specific position of the vanes and, thus, a specific aspect ratio. Alternatively, the vane positions can change stepwise as the cropper input element is actuated, with the rate of alteration of the vane positions proportional to speed of movement or extent of deflection of the cropper input element. A touch pad or other force sensitive input device can be used in the same manner as the rotary or slide switch.

It is preferred that the user be able to manipulate the knob of the switch with a single finger or thumb, without repositioning of the digit. This makes use intuitive and frees up the user's attention for composition and subject matter issues. For this reason and other limitations, a pair of button switches (not shown) may be used as the cropper input element 146, but are not preferred.

Referring again to FIG. 10, in use, the photographer moves the knob, which activates the switch and sends an electrical signal to the controller, which process this signal and sends an appropriate signal to the motor, which turns the mechanism in the required direction and changes the position of the vanes 132,134.

It is preferred that the cropper input element 146 is movable between two opposed cropping control positions. Those positions define a cropping control axis 228. In the embodiment of FIG. 10, the cropper input element 146 slides (indicated by double-headed arrow 228a) between the two positions. The cropper input element 146 rotates (indicated by double-headed arrow 228b) between the two positions. In some embodiments, the camera 10 includes a zoom taking lens that is movable independent of the cropper 130. In those embodiments a zoom input element is disposed on the outside of the shell of the body 12. The zoom input element is movable between two opposed zoom control positions. Those positions define a zoom control axis.

It is preferred that the cropping control axis 228 is perpendicular to the optical axis 77 of the capture unit and that the zoom control axis 230 is parallel to the optical axis 77 and perpendicular to the cropping control axis 228. This approach has the advantage that movement of the zoom control is intuitive. The front to back/back to front zoom control axis 230 corresponds to out and in zooming movements. The side-to-side orientation of the cropping control axis 228 is somewhat intuitive of the cropping process. The movement of the cropper input element 146 can reinforce this further by following a track along the camera that resembles the changed position of the edges of the window. This is shown in FIG. 35.

The cropper input element 146 is switched between positions by manipulation at or toward one side or the other of the camera 10, to alter positions in one direction or other direction. The specific manipulation required in each case can vary. For example, the cropper input element 146 can have two downwardly depressible buttons aligned along the cropping control axis, or a rocker switch or pivotable wheel or pivotable sector aligned so as to pivot from side-to-side. The zoom input element can be provided in the same ways as the cropper input element 146, but in a front-back direction. Both input elements can be provided in a like manner or differently.

Figure 27A:
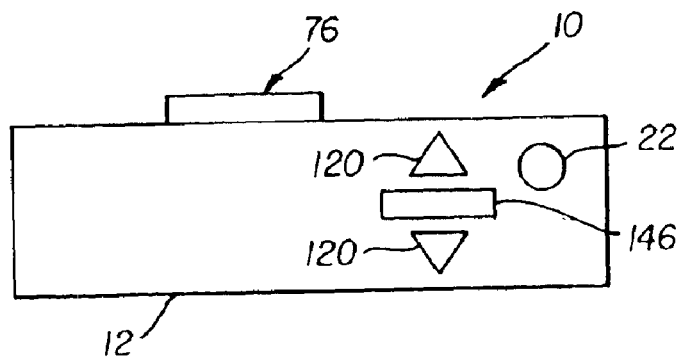
FIGS. 27a–27d are additional embodiments of the camera.

Referring now to FIG. 27a, in a particular embodiment, the cropper input element 146 is a wheel or sector that pivots from side-to-side and the zoom control is a pair of depressible buttons aligned with the middle of the cropper input element 146. This kind of cropper input element 146 mechanically coupled directly to the vanes 132,134 is convenient and relatively simple.

In the embodiment of FIG. 11, the cropper input element is in the form of a manually operated finger wheel or sector that is rotated clockwise to cropping toward the first position and is rotated counter-clockwise to crop toward the second position. The finger wheel can be partially cut away to reduce bulk.

Figure 26:
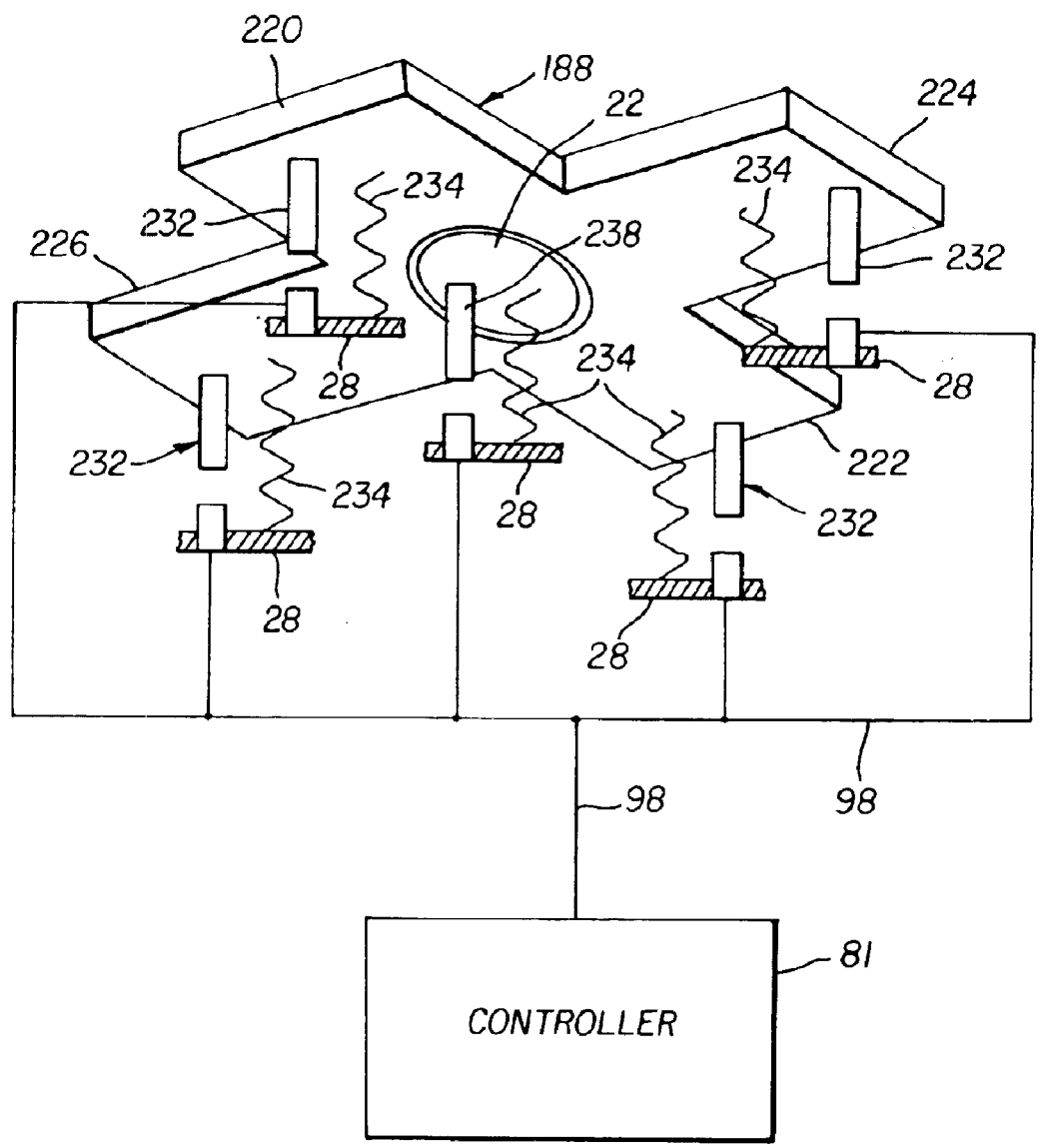
FIG. 26 is a semidiagrammatical view of the four-way rocker button and related circuitry of the camera of FIG. 1. For clarity, underlying portions of the front cover of the camera are indicated by separated segments marked by cross-hatching and the shutter release is shown as a simplified switch.
Figure 27B:
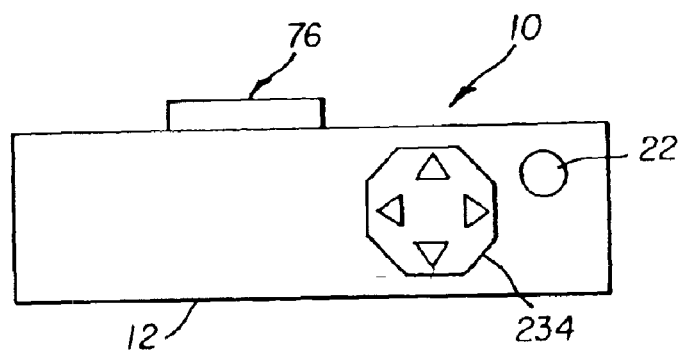
Figure 27C:
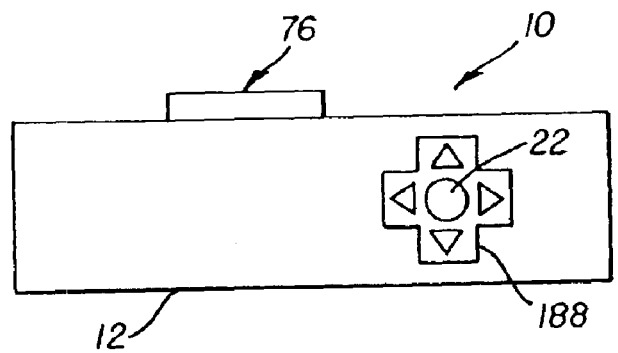
Figure 27D:
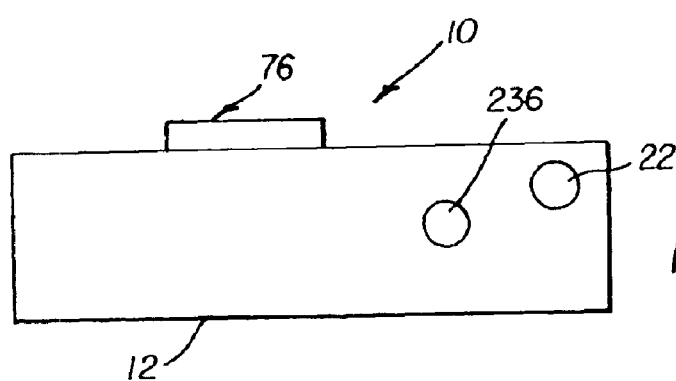

In particular embodiments, the cropper input element 146 and zoom input element have a common user interface that allows the user to crop and zoom the viewfinder image by shifting a finger, without removal and repositioning. This is easier to use without looking than some other types of input elements. Referring now to FIGS. 21a, 26, 27b, and 27c, in particular embodiments, cropping and zooming inputs are provided by a four-way rocker button 188. The button 188 has four pads 220,222,224,226 arranged in a cross. The button 188 is pivotable about orthogonal control and zoom axes 228,230 to actuate any of four switches 232. In the embodiment shown in FIG. 26, springs 234 bear against the switches 232 and an underlying portion of the cover 28 and together bias the button 188 toward a neutral position and the switches toward an open state. Many variants of this four-way button will be apparent to those of skill in the art. For example, FIG. 27b shows a button 234 which can pivot in any direction relative to a vertical axis (coming out of the page in FIG. 27b). The rocker button 234 can be pressed in a diagonal direction to change zoom and cropper mechanisms simultaneously. FIG. 27d is a modification, in which a four-way force-sensing switch 236 replaces the four-way rocker button. FIGS. 27c and 26 are another modification in which a shutter release 22 is disposed in the center of the rocker button 188. (The shutter release switch 238 is shown in simplified form. A two stroke switch, as earlier discussed, is applicable here.) The rocker button 188, in this case, can be configured to require a low amount of force to change positions, with the shutter button 22 configured to require a greater amount of force. FIG. 26 illustrates, in diagrammatical form, an example of such a button and circuitry to the controller 81.

FIGS. 21–25 show the effect of using these controls. FIGS. 21a, 22a, 23a, 24a, and 25a show the top view of a camera with a zoom and crop mechanism controlled by a four-way rocker button 188. The shutter button 22 is separate in this embodiment. Pressing any of the four pads on the rocker button 188 changes the appropriate camera setting, and pressing the pad again or holding the pad down continues to change the setting until the limit is reached. FIGS. 22b, 23b, 24b, and 25b show the result of pressing individual pads until the setting limit is reached.

In FIG. 21a, the current camera settings are the normal zoom position and center intermediate cropper position. FIG. 21b shows the image seen in the viewfinder for an example photographic situation. In this view, three full-height people can be seen.

FIG. 22a shows the effect of pressing the front pad of the rocker button 188. This commands a control input along the zoom control axis 230, which drives the optical zoom lens and viewfinder optics to zoom in and display the image shown in FIG. 22b, which shows an enlarged view of the torso of the center person in the scene.

FIG. 23a shows the effect of pressing the left pad of the rocker button 188. This commands a control input along the cropping control axis 228, which drives the cropper vanes to produce the view shown in FIG. 23b. In this view, the center person can still be seen at the same full-height magnification, but the people on the left and right are cropped out of the image.

Figure 24B:
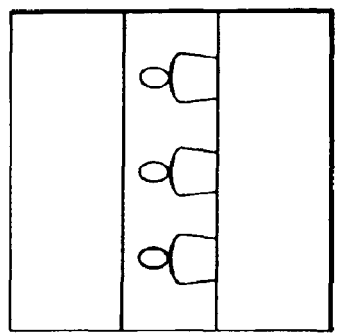
Figure 24A:
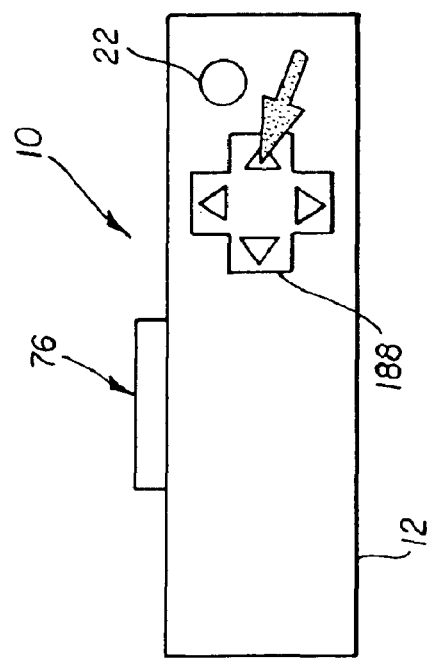
FIG. 24a is the same view as FIG. 21a, but an arrow is added to indicate the effect of a user holding down the rightward pad of the four way zoo-crop input element.

FIG. 24a shows the effect of pressing the right pad of the rocker button 188. This commands an opposite control input along the cropping control axis 228, which drives the cropper vanes to produce the view shown in FIG. 24b. In this view, the magnification remains the same and all three people remain visible, but the legs of the people are cropped out of the image. Note that in order to obtain this view, the photographer had to adjust the view direction slightly, since the subject matter of interest was not centered in the original view. The opportunity to adjust view direction in response to cropping considerations is one of the advantages of the invention.

Figure 25A:
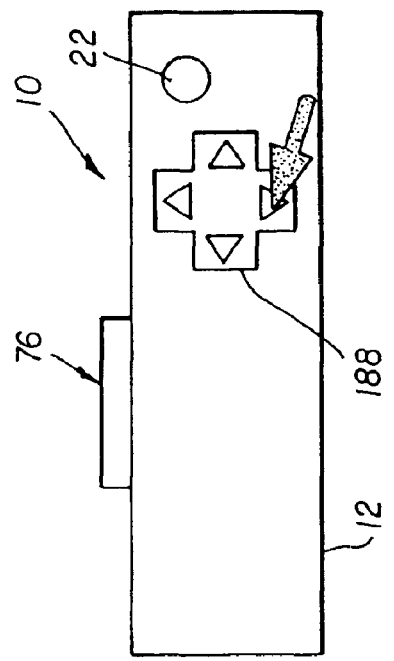
FIG. 25a is the same view as FIG. 21a, but an arrow is added to indicate the effect of a user holding down the rearward pad of the four way zoom-crop input element.

FIG. 25a shows the effect of pressing the back pad of the rocker button 188. This commands a control input along the zoom control axis 230, this time in the zoom out direction. This command drives the optical zoom lens and viewfinder zoom optics to display the image shown in FIG. 25b, which shows a wide angle view of the scene which includes additional people and a large building in the background.

The cropper input element 146 is operated prior to image capture to aid the photographer in capturing a scene. The cropper 130 includes one or more sensors that detect the position of the vanes 132,134 or movement of the vanes 132,134 between the positions. The image captured is indicated by the status of the sensors at the time of capture. The control unit receives signals from the sensors and, in response crops an electronic image to match said window formed by the vanes 132,134 in the current position. The manner of cropping can be varied. For example, the control unit can crop the archival image, immediately after capture, and save the archival image as cropped. Alternatively, an evaluation image can be cropped and displayed to the user for review. The archival image can be cropped and then saved when the user takes an action or fails to act within a default time period. The archival image can be saved without cropping, but with incorporated metadata that provide cropping instructions. The use of metadata instructions in image files is well known to those of skill in the art. With a film camera 10 or film-digital hybrid camera 10, similar instructions can be supplied with images. The use of such instructions is also well known to those of skill in the art. For example, instructions can be provided in a magnetic layer or by optical encodement, as with Advanced Photo System™ films.

In addition to evaluation images and archival images, preliminary images can also be cropped when shown on the camera display 26. This allows use of the display 26 as an electronic viewfinder, in alternation with or simultaneously with an optical viewfinder 58. Just as the viewfinder vanes 132,134 can be either opaque or translucent, the image shown on the display 26 can either completely omit the cropped areas (simulating the opaque vanes 132,134), or show the cropped areas differently, such as with lower contrast (simulating the translucent vanes 132,134).

The cropping provided after capture can be reversible or irreversible. Reversible cropping can be provided by the inclusion of metadata within a digital image (image file or files) that indicates cropping boundaries. Alternatively, information necessary to restore a cropped image can be stored with the cropped image. The provision of metadata of this type within image files is well known to those of skill in the art. The cropping can alternatively be irreversible. In this case, the cropped portions of the image are not saved in long term memory 54.

The irreversible cropping can occur at any stage in the process of capture and storage of the digital image. For example, reading of a CMOS imager 24 can be limited to the uncropped image area, or an uncropped image in memory 54 can be replaced with the corresponding cropped image. Cropping can also be initially reversible and later irreversible. For example, the cropped portions or uncropped copies of the digital images can be temporarily saved prior to later discard. For example, irreversibly cropped digital images can be saved in removable memory 54 and uncropped copies of the cropped images can be saved in non-removable camera memory 54. When the removable memory 54 is removed, the uncropped copies can be automatically discarded.

The cropped images can automatically be output as photographic prints or other final images, in cropped form, using appropriately configured output equipment. Use of metadata to determine the format of printed final images is well known in the art. With irreversibly cropped images, a wide variety of aspect ratios can be present in a set of captured images. Fitting the images to a standard output size in photofinishing equipment can be resolved by chopping paper of a standard width to an arbitrary length corresponding to the photographer's desired aspect ratio for each image. An alternative approach is automatically grouping images and then printing the grouped images as a single sheet, for example, as a printed album page. Images intended for printing only after further manipulation, such as narrow aspect ratio images intended for use on letterhead, can be displayed to the user in the captured and stored aspect ratio and can then be further modified, if desired. The cropped images can also be automatically displayed in cropped form on electronic image displays 26.

The invention has been described in detail with particular reference to certain preferred embodiments thereof, but it will be understood that variations and modifications can be effected within the spirit and scope of the invention.

What is claimed is:

1. A camera comprising:
   a body;
   a capture unit mounted in said body, said capture unit having an imager and storage media operatively connected to said imager, said capture unit selectively capturing an electronic image of a scene;
   a viewfinder displaying a light image of said scene;
   a variable print aspect ratio cropper disposed in said body, said cropper being switchable among a plurality of settings, each said setting defining a different print aspect ratio for a rectangular cross-sectioned window in said viewfinder; and
   a cropping control operatively connected to said capture unit and said cropper, said cropping control having a cropping input element accessible external to said body, said cropping input element being movable between first and second opposed cropping control positions and a plurality of intermediate cropping control positions therebetween to change said settings, each position corresponding to a different one of said settings, said cropping control positions defining a cropping control axis perpendicular to an optical axis of said capture unit.

2. The camera of claim 1 wherein said cropping input element is movable from side to side.

3. The camera of claim 2 wherein said cropping input element is pivotable from side to side between said cropping control positions.

4. The camera of claim 2 wherein said cropping input element is slideable from side to side between said cropping control positions.

5. The camera of claim 1 further comprising a display mounted on said body, said display being operatively connected to said cropping control, said display updating when said settings are changed.

6. The camera of claim 5 wherein said cropping input element is selectively movable between said first and second cropping control positions and said plurality of intermediate cropping control positions and said settings are changed in each of said positions, at a different rate.

7. The camera of claim 1 wherein said cropping input element is selectively movable between said first and second cropping control positions and said plurality of intermediate cropping control positions and said settings are changed in each of said positions, at a different rate.

8. The camera of claim 1 wherein said cropper has a plurality of mechanical vanes and said cropping input element is mechanically coupled to said vanes.

9. The camera of claim 8 wherein said mechanical coupling to said vanes is direct.

10. The camera of claim 1 further comprising a zoom input element accessible external to said body, said zoom input element being movable between two opposed zoom control positions to zoom said electronic image, said zoom control positions defining a zoom control axis parallel to said optical axis of said capture unit and perpendicular to said cropping control axis.

11. The camera of claim 10 further comprising a zoom taking lens propagating a light image of said scene to said imager, said zoom taking lens being deployable among a plurality of focal lengths, and a zoom driver operated by said zoom input element, said zoom driver deploying said taking lens responsive to said zoom control positions.

12. The camera of claim 11 wherein said zoom input element is selectively movable between said first and second zoom control positions and a plurality of intermediate zoom control positions between said first and second zoom control positions, and said focal length of said zoom lens is changed in each of said positions, at a different rate.

13. The camera of claim 11 where in said zoom input element is selectively movable between said first and second zoom control positions and a plurality of intermediate zoom control positions between said first and second zoom control positions, and wherein each of said positions corresponds to a different one of said focal lengths.

14. The camera of claim 10 wherein said cropping input element is movable from side to side.

15. The camera of claim 10 wherein said input elements have a common four-way rocker button, said button being pivotable about both said control axes.

16. The camera of claim 15 wherein said button is simultaneously pivotable about both said control axes.

17. A camera comprising:
    a body;
    a capture unit mounted in said body, said capture unit having an imager and storage media operatively connected to said imager, said capture unit selectively capturing an electronic image of a scene;
    a viewfinder displaying a light image of said scene;
    a cropper disposed in said body, said cropper being switchable among a plurality of settings, each said setting defining a different rectangular cross-sectioned window in said viewfinder; and
    a cropping control operatively connected to said capture unit and said cropper, said cropping control having a cropping input element accessible external to said body, said cropping input element being movable between first and second opposed cropping control positions to change said settings, said cropping control positions defining a cropping control axis perpendicular to an optical axis of said capture unit, said cropping control further comprising a zoom input element accessible external to said body, said zoom input element being movable between two opposed zoom control positions to zoom said electronic image, said zoom control positions defining a zoom control axis parallel to said optical axis of said capture unit and perpendicular to said cropping control axis, wherein said input elements have a common four-way rocker button, said button being pivotable about both said control axes and having a shutter release disposed in the center of said button.

18. A camera comprising:
    a body;
    a capture unit mounted in said body, said capture unit having an imager and storage media operatively connected to said imager, said capture unit selectively capturing an electronic image of a scene;
    a viewfinder displaying a light image of said scene;
    a cropping control operatively connected to said capture unit, said cropping control having a cropper input element accessible external to said body, said cropper input element being pivotable from side to side among a plurality of different cropping positions, each said position defining a different aspect ratio and a cropper axis perpendicular to an optical axis of said capture unit; and a zoom input element accessible external to said body, said zoom input element being pivotable forward and back among a plurality of different zoom control positions, said zoom control positions each defining a different zoom ratio and a zoom control axis parallel to said optical axis of said capture unit and perpendicular to said cropping control axis, wherein said input elements have a common four-way rocker button, said button being pivotable about both said control axes and wherein the capture unit uses the captured electronic image to form an image based upon the cropping position and zoom ratio defined for the captured electronic image to modify the captured electronic image.

19. A camera comprising:

a body;

a capture unit mounted in said body, said capture unit having an imager and storage media operatively connected to said imager, said capture unit selectively capturing an electronic image of a scene;

a viewfinder displaying a light image of said scene;

a cropping control operatively connected to said capture unit, said cropping control having a cropper input element accessible external to said body, said cropper input element being pivotable from side to side among a plurality of different cropping positions defining a control axis perpendicular to an optical axis of the camera, each said position defining a different aspect ratio; and a zoom input element accessible external to said body, said zoom input element being pivotable forward and back among a plurality of different zoom control positions defining a control axis parallel to said optical axis, said zoom control positions each defining a different zoom ratio, wherein said input elements have a common four-way rocker button, said button being pivotable about both said control axes and further comprising a shutter release disposed in the center of said button.

20. The camera of claim 18 wherein said cropping control further comprises a pair of vanes operatively connected to said cropper input element, said vanes being selectively movable, relative to each other, between a first position, through a continuous sequence of intermediate positions, and a second position, said vanes, in each of said positions, defining a different print aspect ratio for a rectangular cross-sectioned window in said viewfinder.

21. The camera of claim 20 wherein said cropper input element is mechanically linked to said vanes.

22. A method of adjusting the aspect ratio and zoom ratio of a viewfinder image comprising the steps of:

directing a viewfinder at a scene, said viewfinder defining a viewfinder axis;

during said directing, moving a cropping control in a direction perpendicular to said viewfinder axis to any position between two opposed limits, to change said aspect ratio in the viewfinder, and moving a zoom control in a direction parallel to said viewfinder axis, to change said zoom ratio, both of said moving steps being performed while continuously retaining one finger contact with said cropping control.

* * * * *